(12) United States Patent
Gladwin et al.

(10) Patent No.: US 11,256,558 B1
(45) Date of Patent: *Feb. 22, 2022

(54) PRIORITIZED DATA REBUILDING IN A DISPERSED STORAGE NETWORK BASED ON CONSISTENCY REQUIREMENTS

(71) Applicant: Pure Storage, Inc., Mountain View, CA (US)

(72) Inventors: S. Christopher Gladwin, Chicago, IL (US); Asimuddin Kazi, Naperville, IL (US)

(73) Assignee: PURE STORAGE, INC., Mountain View, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/842,002

(22) Filed: Apr. 7, 2020

Related U.S. Application Data

(63) Continuation of application No. 16/136,106, filed on Sep. 19, 2018, now Pat. No. 10,649,828, which is a
(Continued)

(51) Int. Cl.
  *G06F 11/07* (2006.01)
  *G06F 11/10* (2006.01)
  (Continued)

(52) U.S. Cl.
  CPC ...... *G06F 11/0727* (2013.01); *G06F 11/1076* (2013.01); *G06F 11/1084* (2013.01); *G06F 11/1088* (2013.01); *G06F 11/1092* (2013.01); *G06F 11/1662* (2013.01); *G06F 11/2069* (2013.01); *G06F 16/18* (2019.01); *G06F 2211/1028* (2013.01)

(58) Field of Classification Search
  CPC ........ G06F 3/065; G06F 3/0619; G06F 3/064; G06F 3/067; G06F 11/1092; G06F 2211/1028
  See application file for complete search history.

(56) References Cited

U.S. PATENT DOCUMENTS

| 4,092,732 A | 5/1978 | Ouchi |
| 5,454,101 A | 9/1995 | Mackay et al. |
| (Continued) | | |

OTHER PUBLICATIONS

Chung; An Automatic Data Segmentation Method for 3D Measured Data Points; National Taiwan University; pp. 1-8; 1998.
(Continued)

*Primary Examiner* — Justin R Knapp
(74) *Attorney, Agent, or Firm* — Garlick & Markison; Timothy W. Markison; Kelly H. Hale

(57) ABSTRACT

A method begins with a processing module transmitting list slice requests to distributed storage network (DSN) storage units regarding storage errors associated with a data segment. The method continues with the processing module receiving list slice response messages and depending on the list slice response messages, determining whether a first threshold priority or a second threshold priority number of error-free EDSs associated with the first data segment has been stored. The method proceeds with the processing module, depending on the number of error-free EDSs associated with the first data segment that have been stored, issuing read slice requests and rebuilding one or more EDSs associated with the data segment.

20 Claims, 22 Drawing Sheets

Related U.S. Application Data continuation of application No. 15/642,875, filed on Jul. 6, 2017, now Pat. No. 10,120,739, which is a continuation-in-part of application No. 14/869,240, filed on Sep. 29, 2015, now Pat. No. 9,727,275.

(60) Provisional application No. 62/086,542, filed on Dec. 2, 2014.

(51) Int. Cl.
    *G06F 11/00*     (2006.01)
    *G06F 11/16*     (2006.01)
    *G06F 11/20*     (2006.01)
    *G06F 16/18*     (2019.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association tor Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

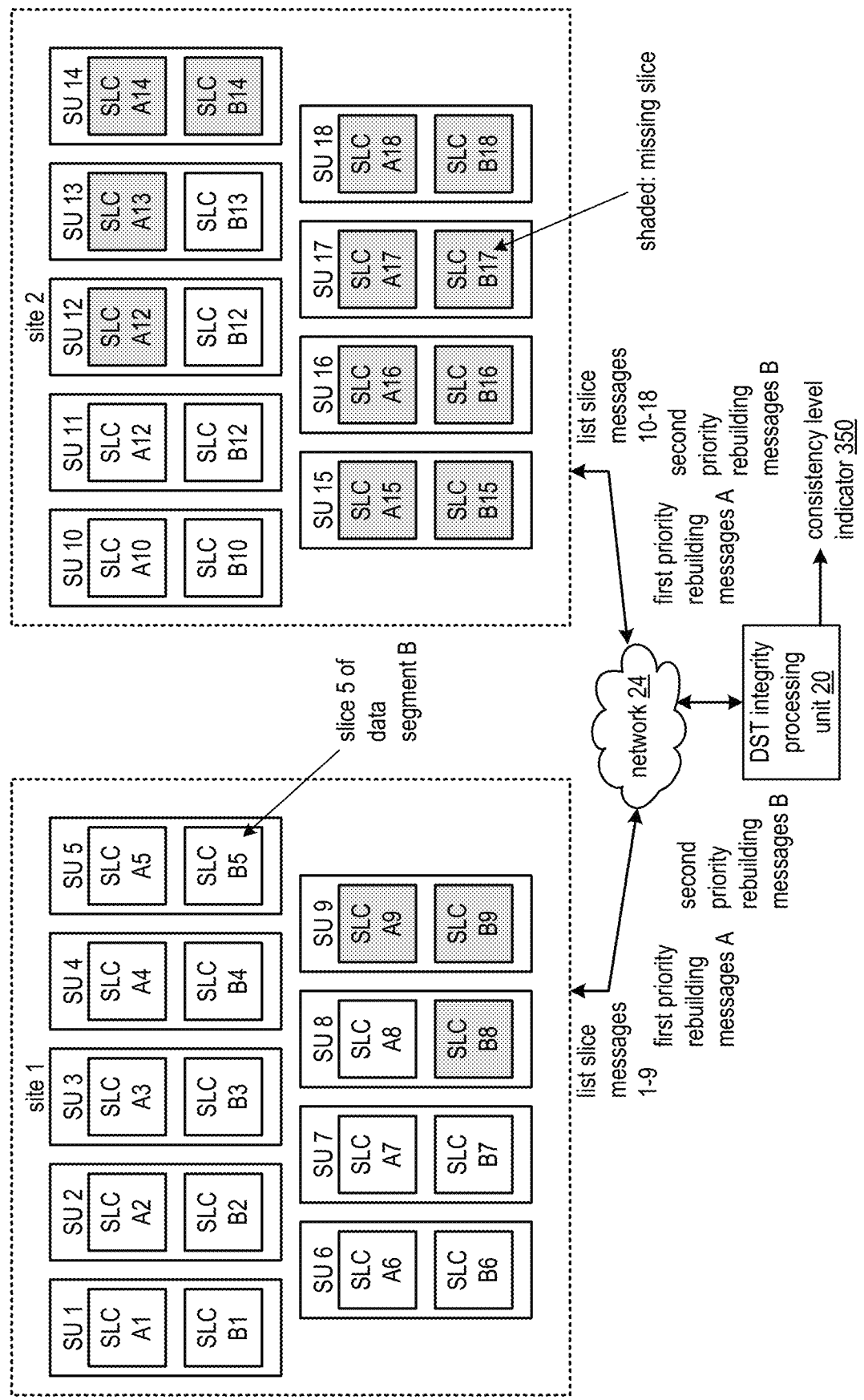

US 11,256,558 B1

PRIORITIZED DATA REBUILDING IN A DISPERSED STORAGE NETWORK BASED ON CONSISTENCY REQUIREMENTS

CROSS REFERENCE TO RELATED PATENTS

The present U.S. Utility Patent Application claims priority pursuant to 35 U.S.C. § 120 as a continuation of U.S. Utility application Ser. No. 16/136,106, entitled "Prioritized Data Rebuilding In A Dispersed Storage Network," filed Sep. 19, 2018, which claims priority as a continuation of U.S. Utility application Ser. No. 15/642,875, entitled "Prioritized Data Rebuilding In A Dispersed Storage Network," filed Jul. 6, 2017, issued as U.S. Pat. No. 10,120,739 on Nov. 6, 2018, which claims priority as a continuation-in-part of U.S. Utility application Ser. No. 14/869,240, entitled "Coordinating Storage Of Data In Dispersed Storage Networks", filed Sep. 29, 2015, issued as U.S. Pat. No. 9,727,275, which claims priority pursuant to 35 U.S.C. § 119(e) to U.S. Provisional Application No. 62/086,542, entitled "Consistent Storage Of Data In A Dispersed Storage Network," filed Dec. 2, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 4A is a schematic block diagram of an embodiment of a dispersed storage network in accordance with the present invention;

Figure 9A:
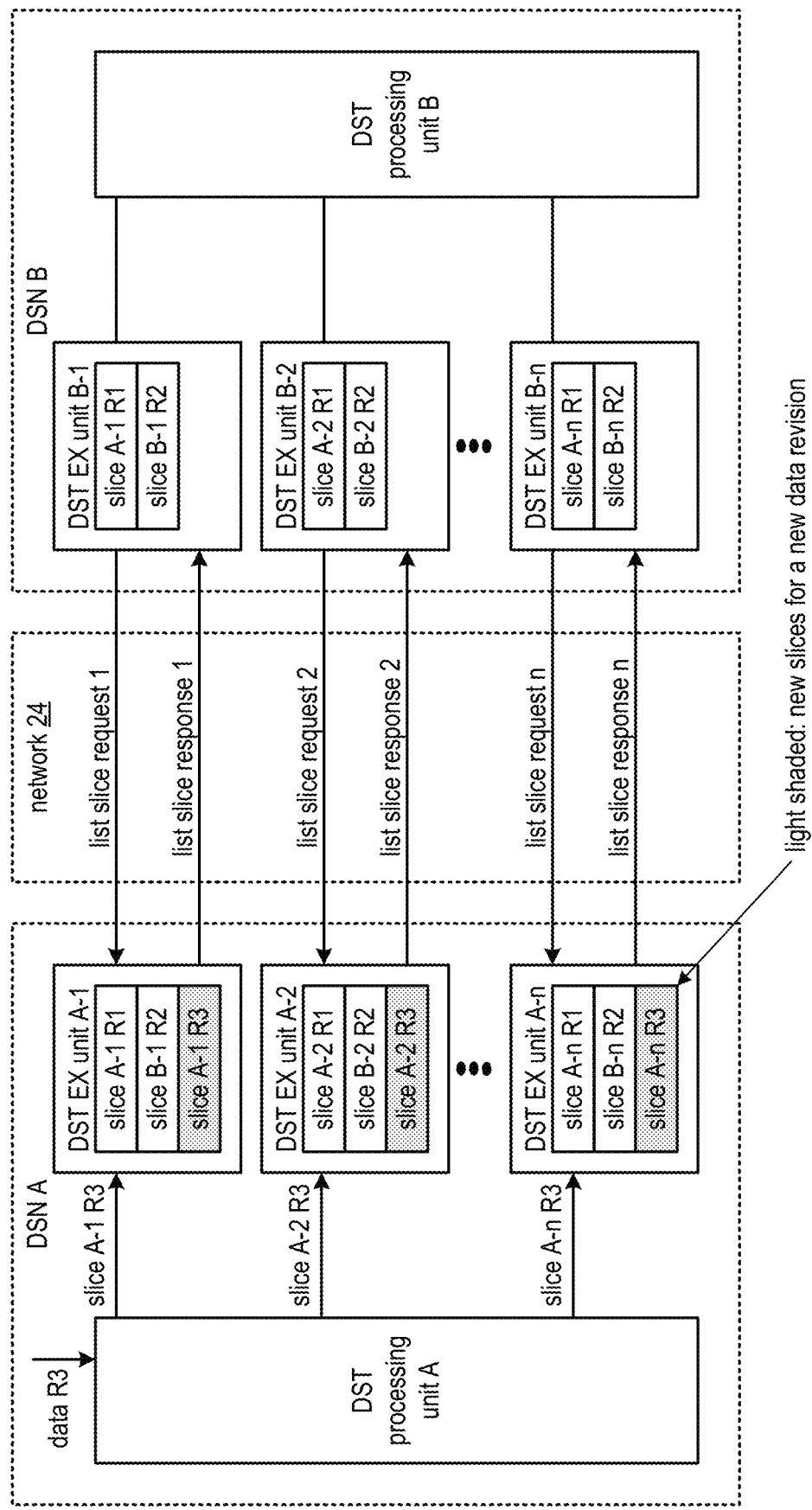
Figure 9B:
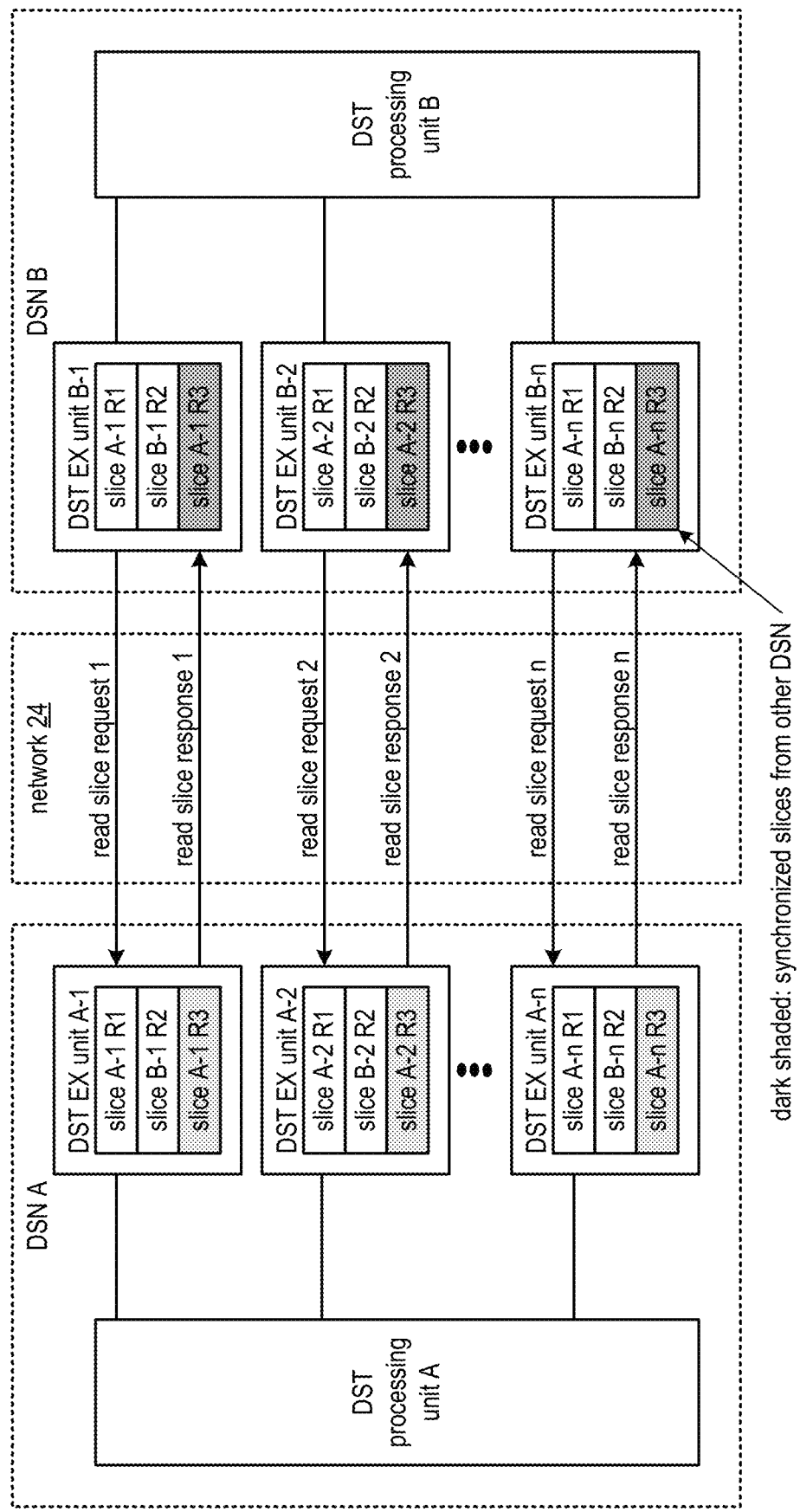
Figure 9C:
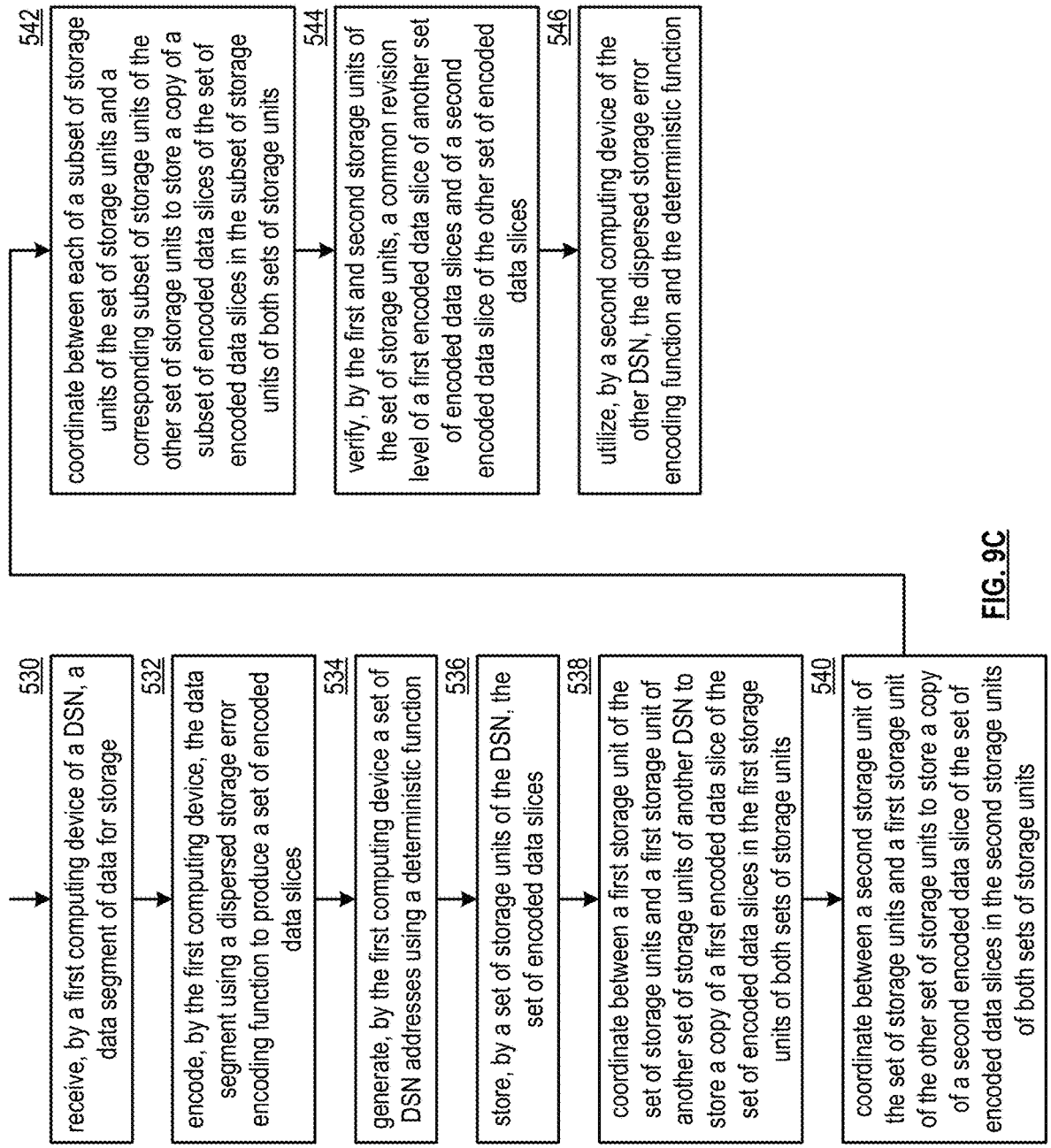
Figure 10A:
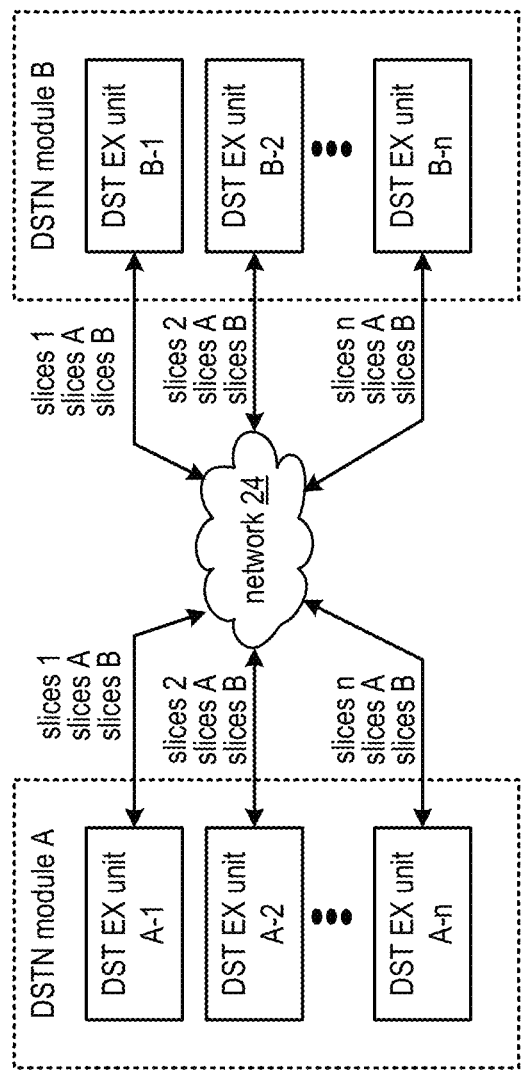
Figure 10B:
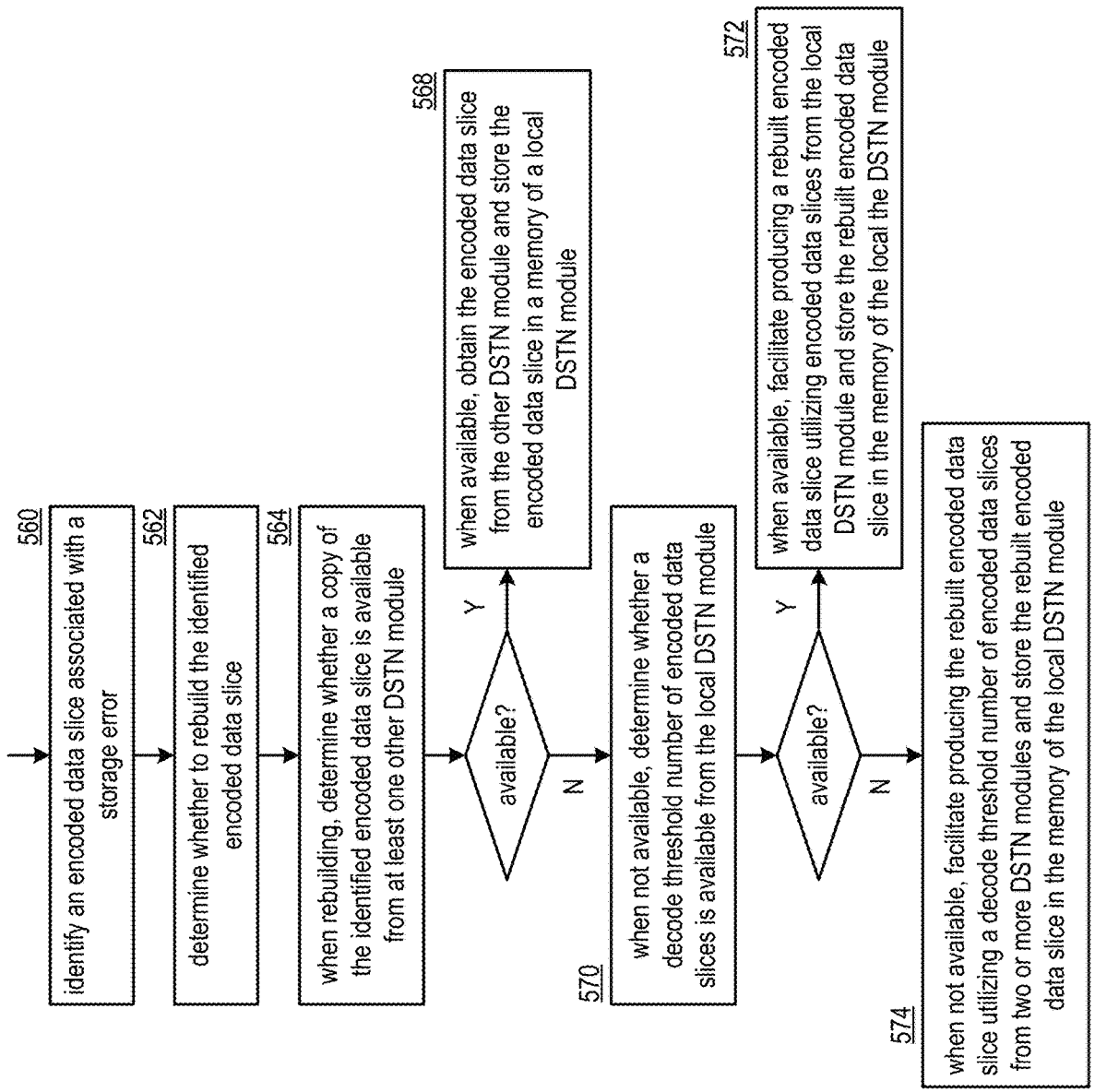
Figure 11A:
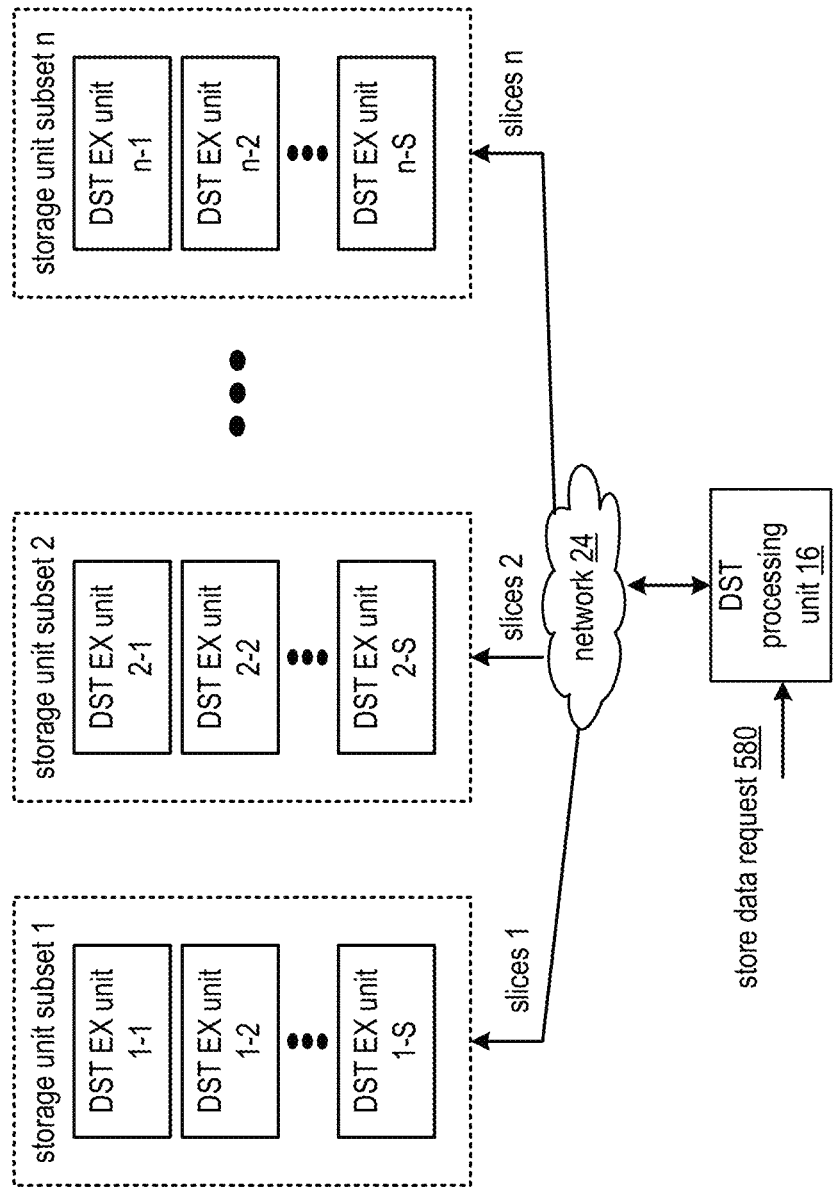
Figure 11B:
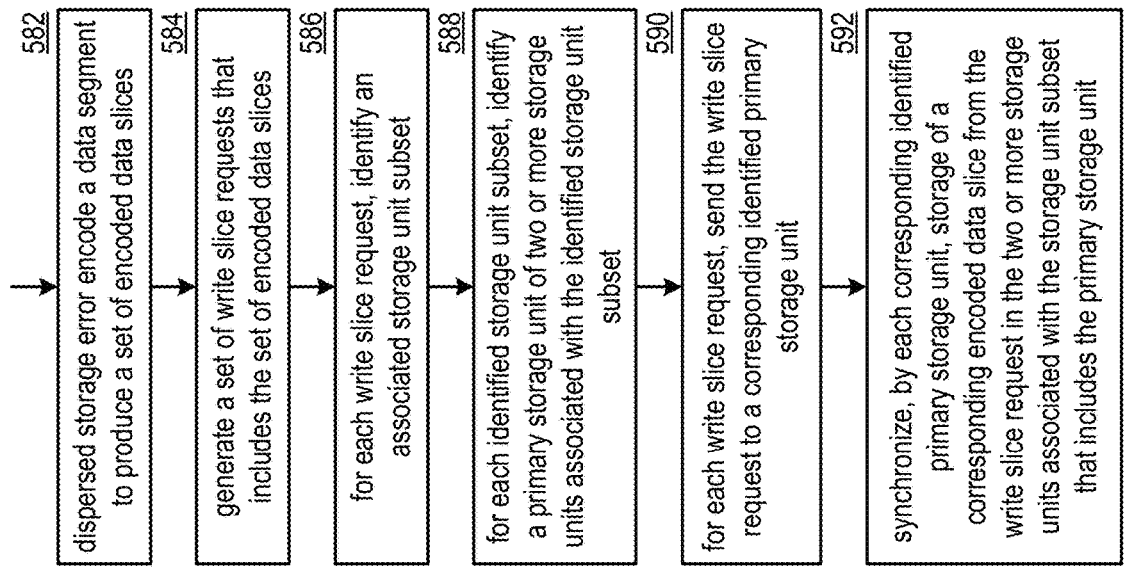
Figure 12A:
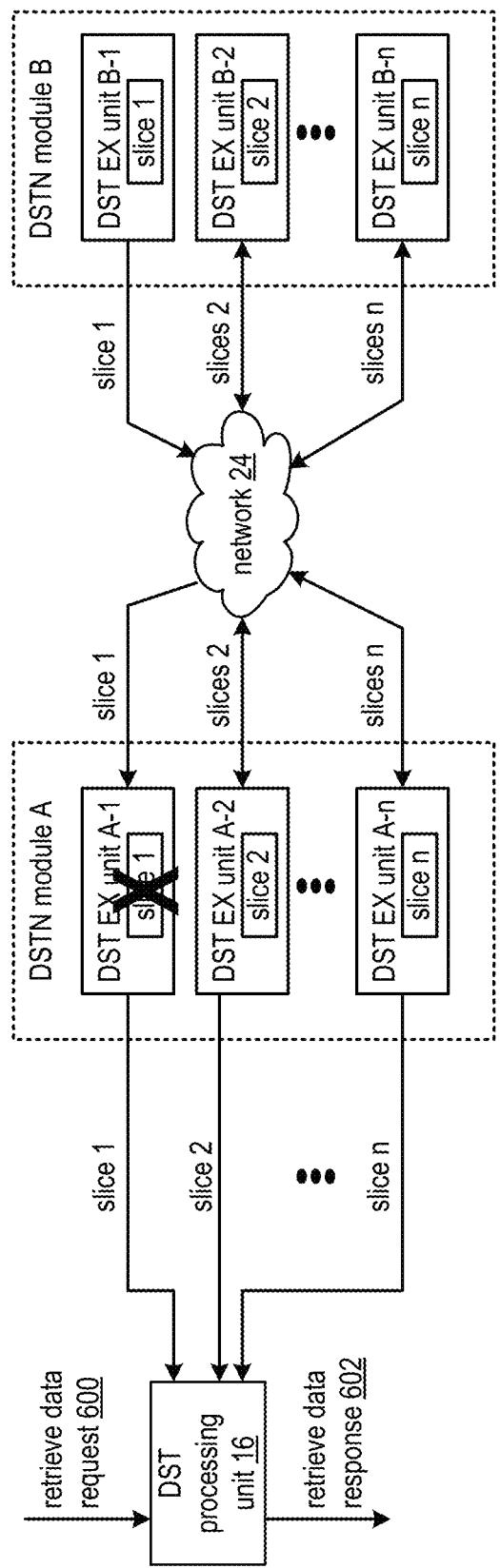
Figure 12B:
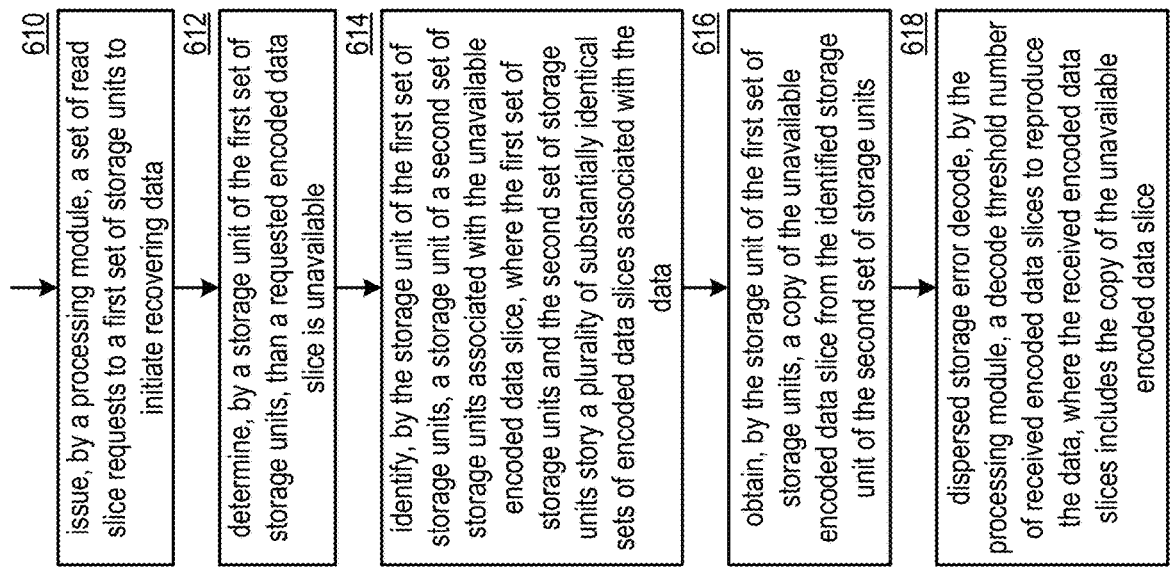

FIGS. 9A-B are schematic block diagrams of another embodiment of a dispersed storage network in accordance with the present invention;

FIG. 9C is a flowchart illustrating an example of coordinating storage of data in dispersed storage networks in accordance with the present invention;

FIG. 10A is a schematic block diagram of another embodiment of a dispersed storage network in accordance with the present invention;

FIG. 10B is a flowchart illustrating another example of rebuilding data in accordance with the present invention;

FIG. 11A is a schematic block diagram of another embodiment of a dispersed storage network in accordance with the present invention;

FIG. 11B is a flowchart illustrating an example of storing data in accordance with the present invention;

FIG. 12A is a schematic block diagram of another embodiment of a dispersed storage network in accordance with the present invention; and FIG. 12B is a flowchart illustrating an example of retrieving stored data in accordance with the present invention.

DETAILED DESCRIPTION OF THE INVENTION

Figure 1:
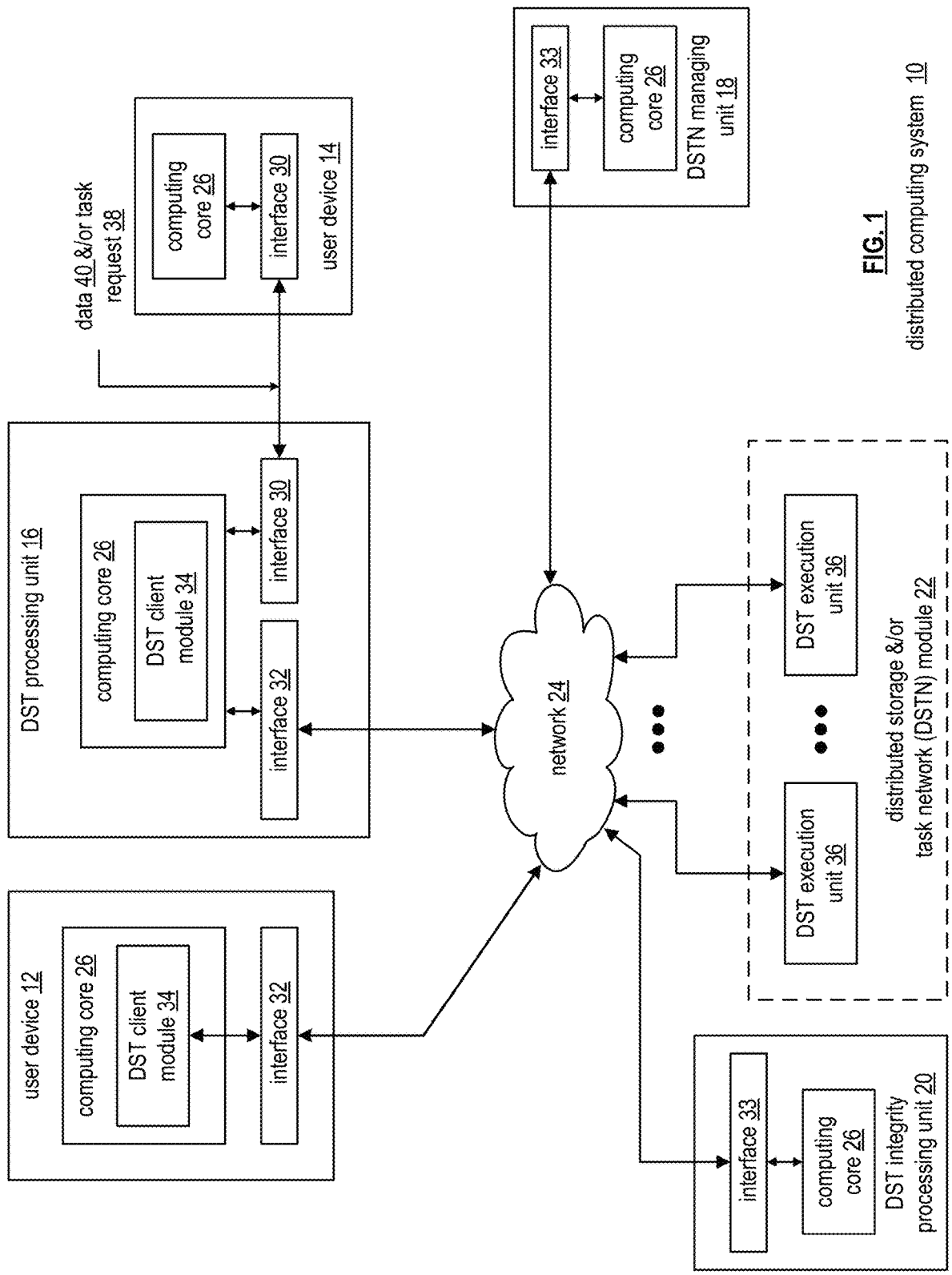
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIG. 3). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
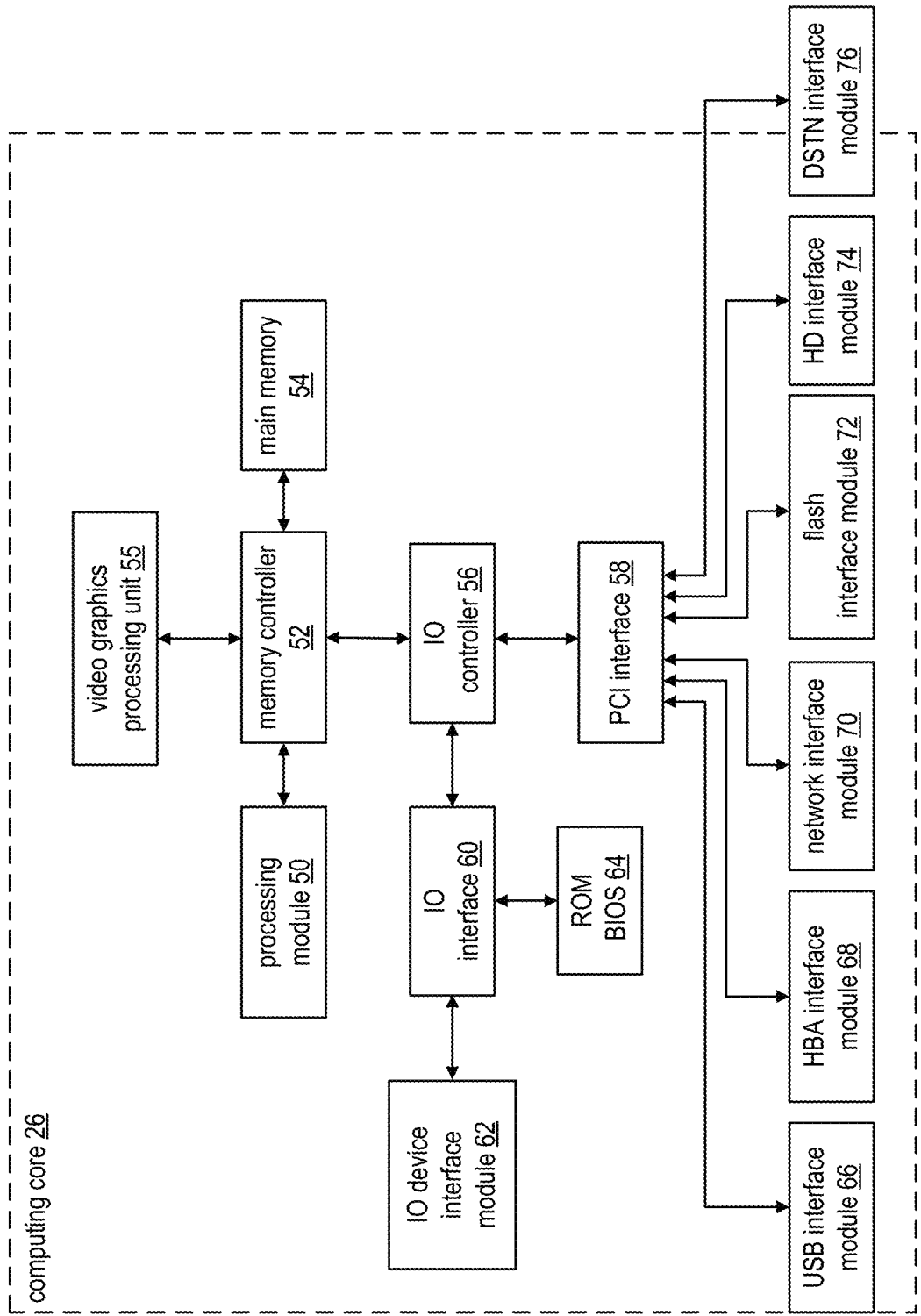
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
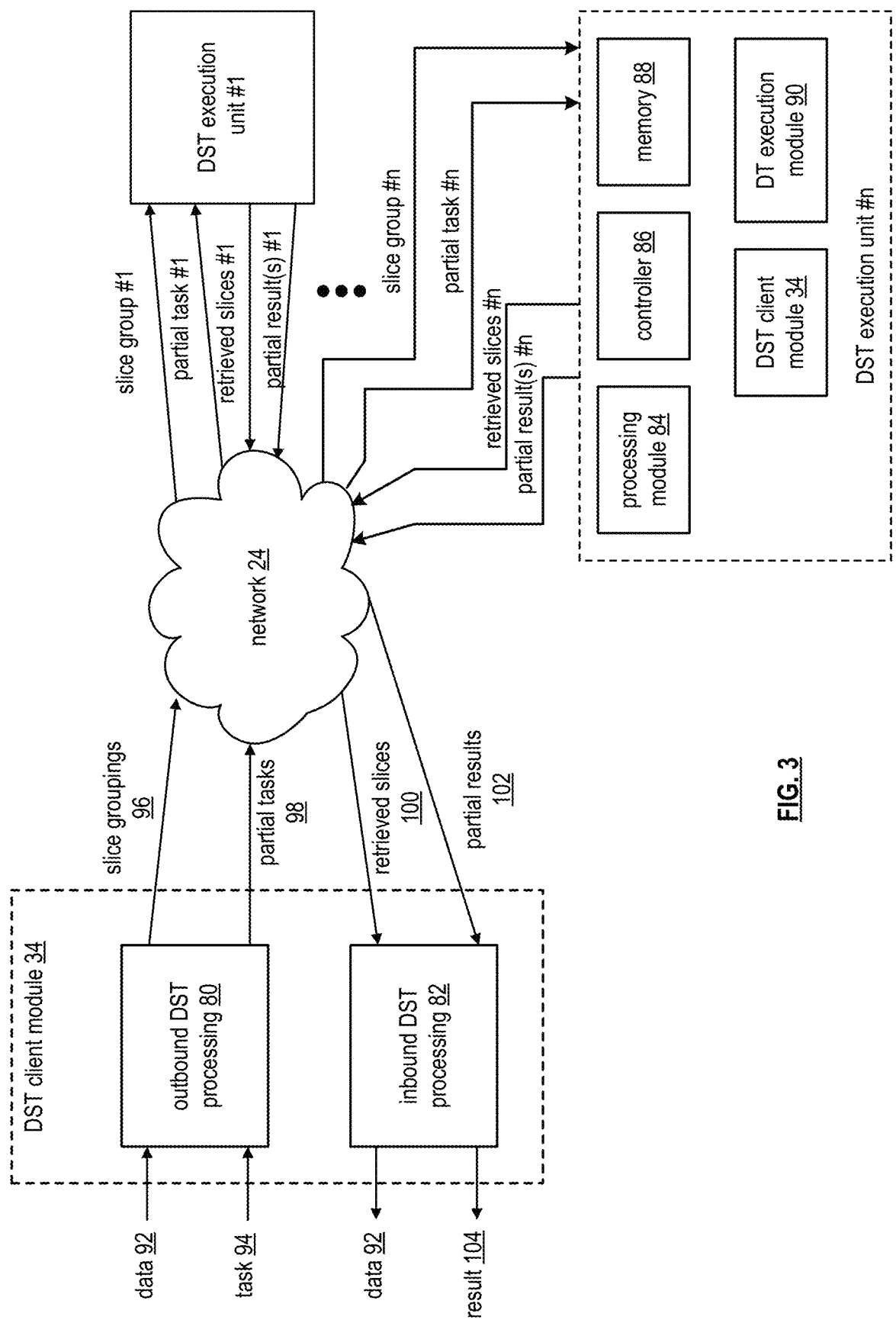
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

FIG. 4A is a schematic block diagram of an embodiment of a dispersed storage network (DSN) that includes at least two sites 1-2, the network 24 of FIG. 1, and the distributed storage and task (DST) integrity processing unit 20 of FIG. 1. Each site includes a plurality of storage units such that at least a decode threshold number of storage units that are implemented at each site and an information dispersal algorithm (IDA) width of an IDA that is utilized to encode data for storage is at least twice the decode threshold number. For instance, each site includes nine storage units when the decode threshold is 8, a read threshold is 8, the decode threshold is 9, and the IDA width is 18. Each storage unit may be implemented utilizing the DST execution (EX) unit 36 of FIG. 1. Alternatively, the DST integrity processing unit 20 may be implemented utilizing a processing module associated with one or more of the storage units.

The DSN is operable to rebuild stored data associated with a storage error, where data is stored as sets of encoded data slices. In an example of operation of the storing of the data with strong consistency, a DST processing unit 16 of FIG. 1 dispersed storage error encodes the data to produce a plurality of sets of encoded data slices, where each set includes an IDA width number of encoded data slices, and where at least a decode threshold number of encoded data slices per set are required to reconstruct the data object. For example, the DST processing unit 16 dispersed storage error encodes a data segment A to produce slices A1 through A18 and dispersed storage error encodes a data segment B to produce slices B1 through B18 when the IDA width is 18. A strong consistency level is associated with guaranteeing that a subsequent reader will recover a latest revision of the data when a strong write threshold plus the read threshold is greater than the IDA width. As such, subsequent reads and writes are forced to overlap which may expose conflicting revisions while exposing the latest revision.

Having produced the encoded data slices, the DST processing unit 16 selects the strong write threshold number based on one or more of a desired consistency level, interpreting a system registry value, and storage unit performance levels. For example, the DST processing unit 16 selects a write threshold of 11, such that 11 plus 8>18, when the strong write threshold is required to support the strong consistency level.

Having selected the write threshold number, the DST processing unit 16 facilitates confirmed storage of at least the strong write threshold number of encoded data slices for each set of encoded data slices. For example, the DST processing unit 16 issues the at least the strong write threshold number of write slice requests to the storage units, where the write slice requests include the plurality of sets of encoded data slices (e.g., slices A1-A18 and slices B1-B18).

In an example of operation of the rebuilding of the stored data, the DST integrity processing unit 20 issues, via the network 24, list slice request messages to storage units and receives list slice response messages from the storage units indicating availability of previously stored encoded data slices. Having received the list slice response messages, the DST integrity processing unit 20 identifies storage errors (e.g., missing slices, corrupted slices) for two or more data segments based on the list slice responses. For example, the DST integrity processing unit 20 identifies missing slices A9, and A12-18 associated with the data segment A and identifies missing slices B8-B9, and B14-B18 associated with the data segment B.

Having identified the storage errors, the DST integrity processing unit 20 assigns a first rebuilding priority to a data segment associated with less than a strong consistency number of remaining error-free encoded data slices. For example, the DST integrity processing unit 20 assigns the first rebuilding priority to the data segment A when the data segment A is associated with storage of 10 remaining error-free encoded data slices and the strong consistency number is 11.

Having assigned the first rebuilding priority, the DST integrity processing unit 20 assigns a second rebuilding priority to another data segment associated with at least the strong consistency number of error-free encoded data slices. For example, the DST integrity processing unit 20 assigns the second rebuilding priority to the data segment B when the data segment B is associated with storage of 11 remaining error-free encoded data slices and strong consistency number is 11.

Having assigned the rebuilding priorities, the DST integrity processing unit 20 issues, via the network 24, read slice requests as first priority rebuilding messages A to storage units associated with the data segment A of the first rebuilding priority (e.g., issue a decode threshold number of read slice requests to storage units known to store available error-free encoded data slices). Having issued the read slice requests, the DST integrity processing unit 20 rebuilds one or more encoded data slices associated with storage errors for the first priority data segment using received slices such that at least a strong consistency threshold number of error-free encoded data slices are available. For example, the DST integrity processing unit utilizes the received slices to rebuild encoded data slice A9.

Having rebuilt the one or more encoded data slices associated with storage errors for the first priority data segment, the DST integrity processing unit 20 issues one or more write slice requests as further first priority rebuilding messages A to a corresponding one or more storage units. For example, the DST integrity processing unit 20 generates a write slice request to include the rebuilt encoded data slice A9 and sends, via the network 24, the write slice request to storage unit 9 associated with storage of the encoded data slice A9.

When substantially all first priority data segments have been updated such that at least the strong consistency number of encoded data slices are stored, the DST integrity processing unit 20 issues a consistency level indicator 350 indicating which data segments of been modified to achieve the strong consistency level. Having issued the strong consistency level indicator, the DST integrity processing unit 20 facilitates rebuilding at least some of the encoded data slices associated with storage errors of data segments of the second rebuilding priority level (e.g., retrieve slices, generate rebuilt slices, store the rebuilt slices, reissue the consistency level indicator).

Figure 4B:
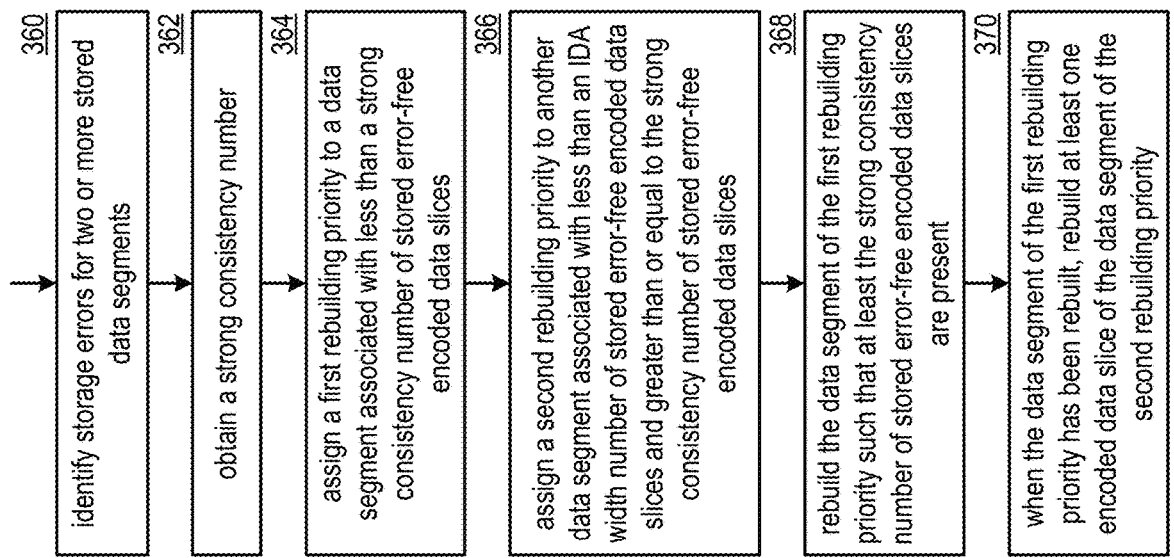
FIG. 4B is a flowchart illustrating an example of prioritizing rebuilding of stored data in accordance with the present invention.

FIG. 4B is a flowchart illustrating an example of prioritizing rebuilding of stored data. The method begins or continues at step 360 where a processing module (e.g., of a distributed storage and task (DST) client module performing rebuilding operations) identifies storage errors for two or more store data segments. For example, the processing module issues list slice request, receives list slice responses, and identifies encoded data slices requiring rebuilding (e.g., by comparing the list slice responses to detect missing slices or by receiving an indication of a corrupted slice). As another example, the processing module interprets at least one of a received error message and a received rebuilding request.

The method continues at step 362 where the processing module obtains a strong consistency number. The obtaining includes at least one of receiving, interpreting a system registry entry, and determining based on one or more of an information dispersal algorithm (IDA) width number, a decode threshold number, and availability goal level, and a storage reliability goal level.

The method continues at step 364 where the processing module assigns a first rebuilding priority to a data segment associated with less than a strong consistency number of stored error-free encoded data slices. For example, the processing module identifies a data segment associated with fewer than the strong consistency number of error-free slices and indicates one or more of error-free slices, error slices, and slice names.

The method continues at step 366 where the processing module assigns a second rebuilding priority to another data segment associated with less than an IDA width number of stored error-free encoded data slices and greater than or equal to the strong consistency number of stored error-free encoded data slices. For example, the processing module identifies a data segment with greater than or equal to the strong consistency number of error-free slices and less than the IDA width number and indicates one or more of good slices, error slices, and slice names.

The method continues at step 368 where the processing module rebuilds the data segment of the first rebuilding priority such that at least the strong consistency number of stored error-free encoded data slices are present. For example, the processing module obtains a decode threshold number of slices, dispersed storage error decodes the obtained slices to reproduce the data segment, dispersed storage error encodes the reproduced data segment to produce one or more encoded data slices, and stores at least enough of the rebuilt encoded data slices in storage units such that at least the strong consistency number of error-free slices are present.

When the data segment of the first rebuilding priority has been rebuilt, the method continues at step 370 where the processing module rebuilds at least one encoded data slice of the data segment of the second rebuilding priority. For example, the processing module obtains a decode threshold number of encoded data slices, dispersed storage error decodes the obtained slices to reproduce another data segment, dispersed storage error encodes the other data segment to produce one or more further slices, and stores at least one of the further rebuilt encoded data slices in storage units.

Figure 5A:
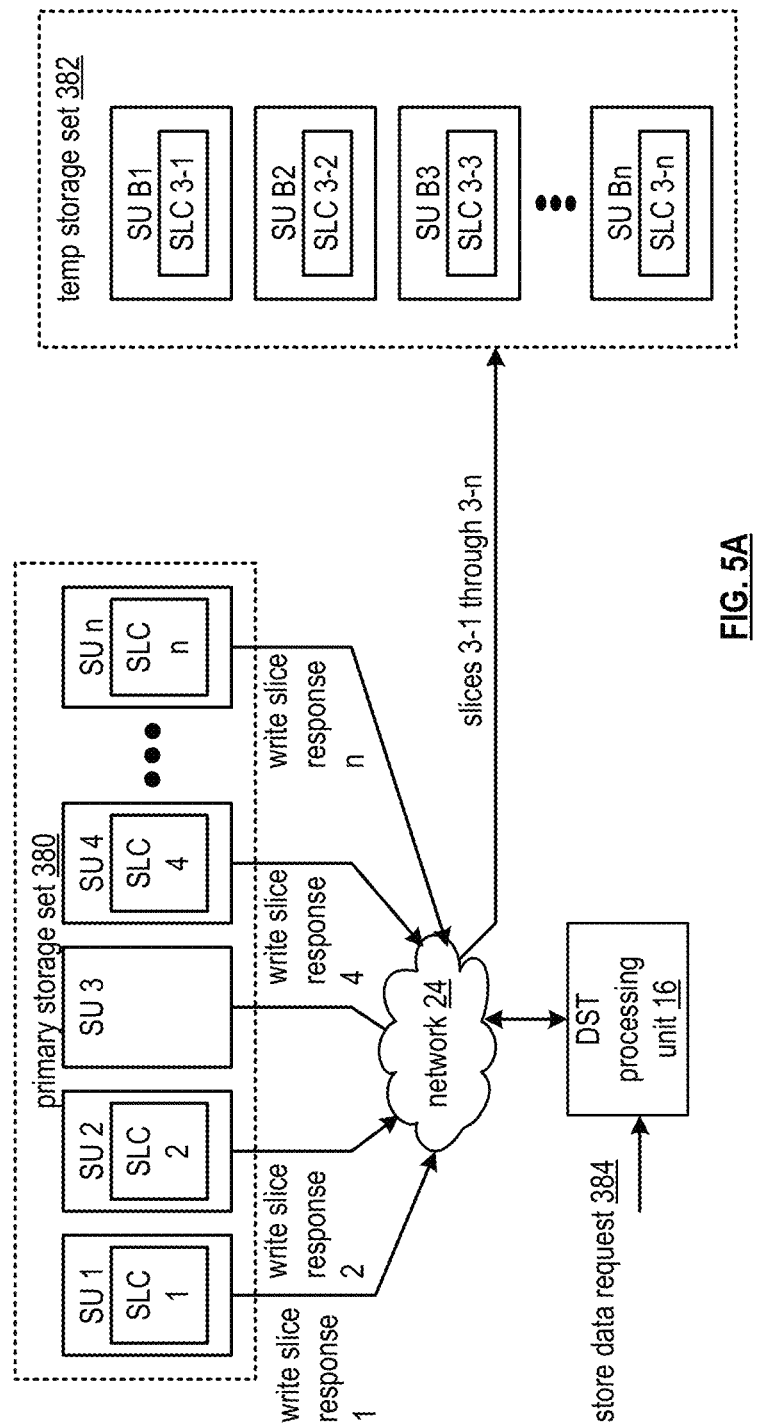
FIG. 5A is a schematic block diagram of another embodiment of a dispersed storage network in accordance with the present invention.

FIG. 5A is a schematic block diagram of another embodiment of a dispersed storage network that includes a primary storage set 380, a temporary storage set 382, the network 24 of FIG. 1, and the distributed storage and task (DST) processing unit 16 of FIG. 1. The primary storage set 380 includes a set of storage units 1-*n*. The temporary storage set 382 includes another set of storage units B1-B*n*. A number of storage units of the primary storage set may be different or the same as a number of storage units of the temporary storage set. Each storage unit may be implemented utilizing the DST execution (EX) unit 36 of FIG. 1.

The DSN functions to store data in one or more of the primary storage set 380 and the temporary storage set 382. In an example of operation of the storing of the data, the DST processing unit 16 receives a store data request 384, where the store data request 384 includes one or more of the data, a data identifier, and a requesting entity identifier. Having received the store data request 384, the DST processing unit 16 dispersed storage error encodes the data to produce a plurality of sets of encoded data slices. Having produced the encoded data slices, the DST processing unit 16 generates one or more sets of write slice requests, where the one or more sets of write slice requests includes the plurality of sets of encoded data slices.

Having produced the one or more sets of write slice requests, the DST processing unit 16 issues, via the network 24, the one or more write slice requests to the storage units of the primary storage set. Each storage unit receiving a write slice request that also successfully stores a received encoded data slice, issues a write slice response, via the network 24, to the DST processing unit 16 indicating that the encoded data slice has been successfully stored. For example, the storage unit 1 issues a write slice response 1 to the DST processing unit 16, where the write slice response 1 indicates that an encoded data slice 1 has been successfully stored within the storage unit 1.

The DST processing unit 16 receives write slice responses from at least some of the storage units of the primary storage set. When the DST processing unit 16 receives write slice responses indicating that at least a write threshold number of encoded data slices have been successfully stored, the DST processing unit 16 may detect a failure of storage of an encoded data slice associated with the storage error. The detecting includes at least one of interpreting a received write slice response that indicates that the storage error and determining that a storage timeframe has elapsed since issuing a write slice request without receiving a corresponding write slice response. For example, the DST processing unit 16 indicates that an encoded data slice 3 is an error slice when the DST processing unit 16 determines that the storage timeframe elapsed for storage of an encoded data slice 3 that was sent to the storage unit 3 for storage, without receiving an indication that the encoded data slice 3 was successfully stored.

Having determined the error slice, the DST processing unit 16 determines whether to temporarily store the encoded data slice. The determining may be based on one or more of expected future availability of the storage unit 3 associated with the error slice, a predetermination, a priority level, interpreting a request, interpreting a system registry entry, and the requesting entity identifier. For example, the DST processing unit 16 indicates to temporarily store the encoded data slice when the expected future availability of the storage unit 3 is less than an availability threshold level. As another example, the DST processing unit 16 indicates to temporarily store the encoded data slice when an interpretation of the system registry indicates to temporarily store all detected error slices associated with a virtual storage vault affiliated with the requesting entity identifier.

When temporarily storing encoded data slice, the DST processing unit 16 dispersed storage error encodes the error slice to produce a set of temporary encoded data slices. For example, the DST processing unit 16 dispersed storage error encodes encoded data slice 3 to produce temporary encoded data slices 3-1 through 3-*n*. Having produced the set of temporary encoded data slices, the DST processing unit 16 facilitates storage of the set of temporary encoded data slices in storage units of the temporary storage set. For example, the DST processing unit 16 issues, via the network 24, a set of write temporary slice requests to storage units B1 through Bn, where the set of write temporary slice requests includes the set of temporary encoded data slices 3-1 through 3-*n*.

Subsequent to storage of the set of temporary encoded data slices, the DST processing unit 16 determines to re-store the error slice in the primary set of storage units. The determining may be based on one or more of detecting that a wait timeframe has expired from a previous attempt, detecting that a storage unit error condition has subsided, favorable storage unit availability is detected, receiving a recovery request for the error slice, detecting that available capacity of the temporary storage set is less than a low threshold level, and detecting that an activity indicator indicates a level of activity that is lower than a low threshold level. Alternatively, or in addition to, a storage unit of the primary storage set determines to re-store the error slice in the primary set of storage units.

Having determined to re-store the error slice in the primary set of storage units, the DST processing unit 16 recovers the encoded data slice from the temporary stored set. For example, the DST processing unit 16 issues, via the network 24, a set of read slice requests to the storage units B1-Bn, receives read slice responses, and dispersed storage error decodes a decode threshold number of received temporary encoded data slices to reproduce encoded data slice 3.

Having reproduced the error slice, the DST processing unit 16 facilitates storage of the reproduced error slice in a primary storage set. For example, the DST processing unit 16 issues, via the network 24, a write slice request to storage unit 3, where the write slice request includes the reproduced encoded data slice 3.

Figure 5B:
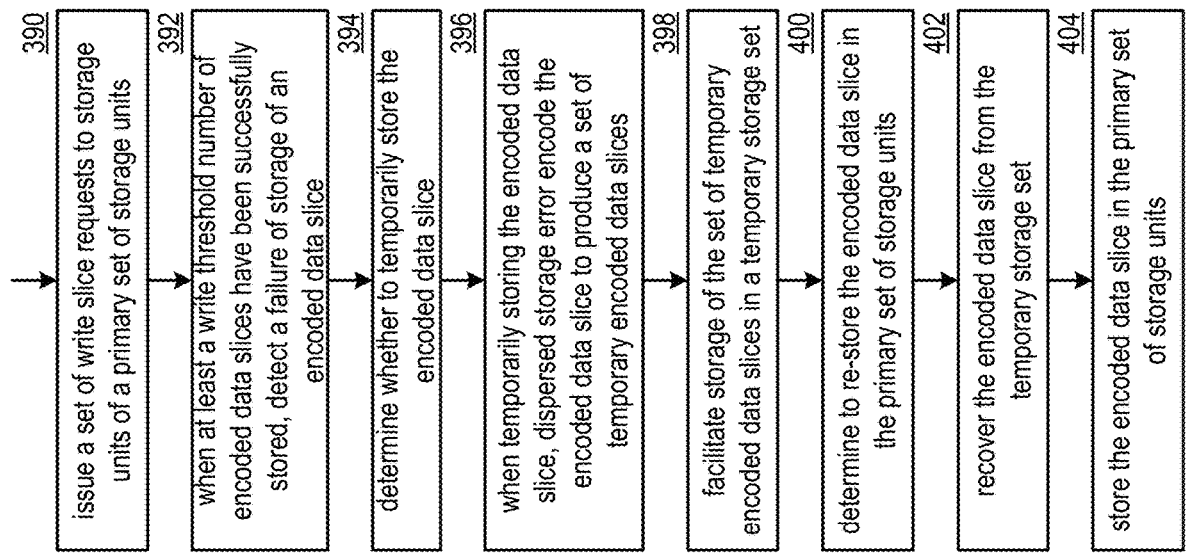
FIG. 5B is a flowchart illustrating an example of storing data in accordance with the present invention.

FIG. 5B is a flowchart illustrating an example of storing data. The method begins or continues at step 390 where a processing module (e.g., of a distributed storage and task (DST) client module of a DST processing unit) issues a set of write slice requests to storage units of a primary set of storage units. For example, the processing module dispersed storage error encodes data to produce a plurality of sets of encoded data slices, generates the set of write slice requests to include one or more sets of encoded data slices of the plurality of sets of encoded data slices, and sends the set of write slice requests to the set of storage units of the primary set of storage units.

When at least a write threshold number of encoded data slices have been successfully stored, the method continues at step 392 where the processing module detects the failure of storage of an encoded data slice. For example, the processing module determines that the write threshold number of encoded data slices have been successfully stored based on interpreting a received write slice responses, and identifies the failure of the storage of the encoded data slice based on the received write slice responses (e.g., a missing response, interpreting a received response that indicates a storage error).

The method continues at step 394 where the processing module determines whether to temporarily store the encoded data slice. The determining may be based on one or more of availability of a storage unit associated with the detected failure of storage, a predetermination, a priority level, a request, a lookup, and a requesting entity identifier. For example, the processing module indicates to temporarily store the encoded data slice when determining that availability of the storage unit associated with encoded data slice is unfavorable (e.g., the storage unit is not expected to be available for a time frame that is greater than a maximum threshold time level or the storage unit availability timing is unknown).

When temporarily storing encoded data slice, the method continues at step 396 where the processing module dispersed storage error encodes the encoded data slice to produce a set of temporary encoded data slices. The method continues at step 398 where the processing module facilitates storage of the set of temporary encoded data slices in a temporary storage set. The facilitating includes identifying a storage location of the temporary storage set based on one or more of a predetermination, interpreting a system registry, receiving a request, and identifying the temporary storage set. The facilitating further includes generating a set of write slice requests that includes the set of temporary encoded data slices and sending the set of temporary encoded data slices to the temporary storage set.

The method continues at step 400 where the processing module subsequently determines to re-store the encoded data slice in the primary set of storage units. The determining may include one or more of detecting that an expiration timeframe has expired since a previous storage attempt of encoded data slice, and detecting favorable availability of a storage unit associated with the encoded data slice and the primary set of storage units.

The method continues at step 402 where the processing module recovers the encoded data slice from the temporary storage set. For example, the processing module issues read slice requests to the temporary storage set, receives read slice responses, and dispersed storage error decodes a decode threshold number of received temporary encoded data slices to reproduce the encoded data slice.

The method continues at step 404 where the processing module stores the encoded data slice in the primary set of storage units. For example, the processing module identifies the storage unit associated with the encoded data slice, generates a write slice request that includes the reproduced encoded data slice and a slice name associated with the encoded data slice, and sends the write slice request to the identified storage unit.

Figure 6A:
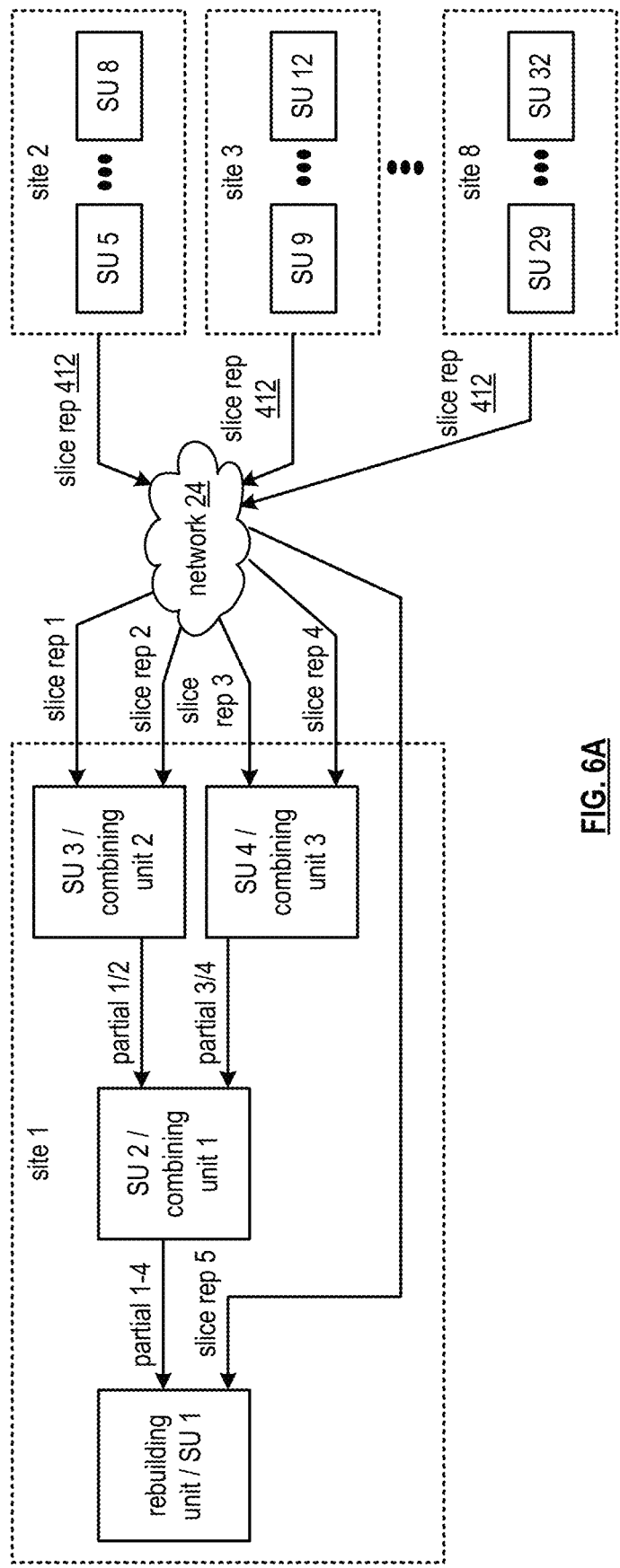
FIG. 6A is a schematic block diagram of another embodiment of a dispersed storage network in accordance with the present invention.

FIG. 6A is a schematic block diagram of another embodiment of a dispersed storage network that includes a plurality of sites and the network 24 of FIG. 1. Each site includes a plurality of storage units. Each storage unit may be implemented utilizing the distributed storage and task (DST) execution unit 36 of FIG. 1.

The DSN functions to store data, where the data is dispersed storage error encoded to produce a plurality of sets of encoded data slices for storage in the storage units and where each set of encoded data slices includes an information dispersal algorithm (IDA) width number of encoded data slices. The storage includes utilizing storage units associated with at least two sites to store a decode threshold number of encoded data slices of each set of encoded data slices, where the decode threshold number of encoded data slices are required to recover a corresponding data segment of the data. For example, recovery of one encoded data slice from a corresponding storage unit at each of 5 of 8 sites is required to recover the data when the set of encoded data slices is stored across 8 sites at one storage unit per site when the IDA width is 8 and the decode threshold is 5.

The DSN further functions to rebuild stored data when a storage error is detected. At least some of the storage units are operable to perform various functions to facilitate the rebuilding of the store data. The various functions include one or more of storing encoded data slice, retrieving an encoded data slice, detecting the storage error, generating a partially decoded encoded data slice (e.g., interchangeably referred to as a partial slice), receiving partial slices, combining partial slices to produce further partial slices, and generating a rebuilt encoded data slice.

In an example of operation of the rebuilding of the store data, the storage unit 1 determines to rebuild an encoded data slice associated with the storage error (e.g., a missing slice or corrupted slice is detected locally by the storage unit 1), where a data segment was dispersed storage error encoded to produce a set of encoded data slices that includes the encoded data slice. Having determined to rebuild encoded data slice, the storage unit 1 executes further functions of a rebuilding unit as described below. Hereafter for this example, the storage unit 1 reference and the rebuilding unit reference may be utilized interchangeably.

Having determined to rebuild the encoded data slice associated with the storage error, the rebuilding unit determines a number of combining units to offload a burden of receiving slice representations to enable the rebuilding of the encoded data slice. The combining units includes storage units that are available to perform the receiving partial slices and the combining partial slices functions. The determining may be based on one or more of a number of available storage units at a common site with the rebuilding unit, system configuration information, the decode threshold number, and a performance goal. For example, the rebuilding unit determines to utilize three combining units when storage units 2-4 are available to perform combining unit functions.

Having determined the number of combining units, the rebuilding unit selects the combining units in accordance with the number of combining units and based on one or more of storage unit availability, local network available capacity, wide area network available capacity, and the system configuration. For instance, the rebuilding unit determines to utilize the storage units 2-4 as combining units 1-3 to receive 4 of 5 slice representations when the decode threshold is 5 and the storage units 2-4 are co-located at a common same site with the rebuilding unit. Hereafter for this example, storage units 2-4 may be referred to interchangeably as combining units 1-3.

Having selected the combining units, the rebuilding unit facilitates receiving, by the combining units and the rebuilding unit, slice representations 412 of the decode threshold number of encoded data slices of the set of encoded data slices. Each slice representation 412 of an encoded data slice includes at least one of the encoded data slice and a corresponding partially decoded encoded data slice (e.g., partial slice) based on the encoded data slice of the storage error. For example, the rebuilding unit issues slice representation retrieval requests to storage units of the DSN that stores the decode threshold number of encoded data slices, where each request includes one or more of an encoded data slice or partial slice indicator, a slice name of the encoded data slice of the storage error, a slice name of the encoded data slice of the request of slice representation, a partial decoding matrix, an encoding matrix, identifiers of the decode threshold number of encoded data slices, and a destination identifier for the slice representation (e.g., an identifier for a particular combining unit, an identifier of the rebuilding unit). For instance, the rebuilding unit issues, via the network 24, the decode threshold number of slice representation retrieval requests to a corresponding storage unit at five other sites.

Each storage unit receiving a slice representation retrieval request generates a corresponding slice representation 412 and sends, via the network 24, the slice representation 412 to at least one of a corresponding combining unit and the rebuilding unit in accordance with an associated destination identifier. Alternatively, two storage units at a common site generate two partial slices, combine the two partial slices to generate a common partial slice, and send the common partial slice to the at least one of the corresponding combining unit and the rebuilding unit.

The storage unit generates each partial slice based on the request and a locally stored encoded data slice associated with the request. The generating of the partial slice includes one or more of obtaining an encoding matrix utilized to generate the locally stored encoded data slice (e.g., extract from the request, retrieve from a memory), reducing the encoding matrix to produce a square matrix that exclusively includes rows identified in the request (e.g., slice pillars associated with participating storage units of the decode threshold number of storage units), inverting the square matrix to produce an inverted matrix (e.g., alternatively, may extract the partial decoding matrix from the request as the inverted matrix), matrix multiplying the inverted matrix by the locally stored encoded data slice to produce a vector, and matrix multiplying the vector by a row of the encoding matrix corresponding to the encoded data slice to be rebuilt (e.g., alternatively, may extract the row from the request), to produce the partial slice (e.g., encoded data slice to be rebuilt identified in the request).

Each of the combining units combine received slice representations to produce a combined partial slice. For example, each combining unit generates partial slices based on received encoded data slices (e.g., from a remote storage unit, from a storage unit of the combining unit) and performs the addition of partial slices in a field of arithmetic utilized to encode the set of encoded data slices to produce the combined partial slice when the slice representations include encoded data slices. As another example, each combining unit adds the received partial slices in the field of arithmetic utilized to encode a set of encoded data slices (e.g., exclusive OR logical function) to produce the combined partial slice when the slice representations include partial slices. For instance, combining unit 2 performs the exclusive OR logical function on a partial slice 1 of slice representation 1 and a partial slice 2 of slice representation 2 to produce a combined partial slice 1/2, combining unit 3 performs the exclusive OR logical function on a partial slice 3 of slice representation 3 and a partial slice 4 of slice representation 4 to produce a combined partial slice 3/4.

As such, each combining unit receives two slice streams rather than the combining unit receiving five slice streams. The combining units may further operate in a sequential manner to further limit utilized inbound bandwidth utilization. For example, combining unit 1 performs the exclusive OR logical function on the combined partial slice 1/2 and the combine partial slice 3/4 to produce a combined partial slice 1-4.

With the combining units providing at least one combined partial slice, the rebuilding unit combines all of one or more combined partial slices from the combining units and any further received slice representations to produce a rebuilt encoded data slice. For example, the rebuilding unit performs the exclusive OR logical function on the combined partial slice 1-4 and a partial slice 5 of a received slice representation 5 to produce the rebuilt encoded data slice when the received slice representation 5 includes the partial slice 5. The rebuilding unit may subsequently store the rebuilt encoded data slice in the storage unit 1 to remedy the detected storage error.

Figure 6B:
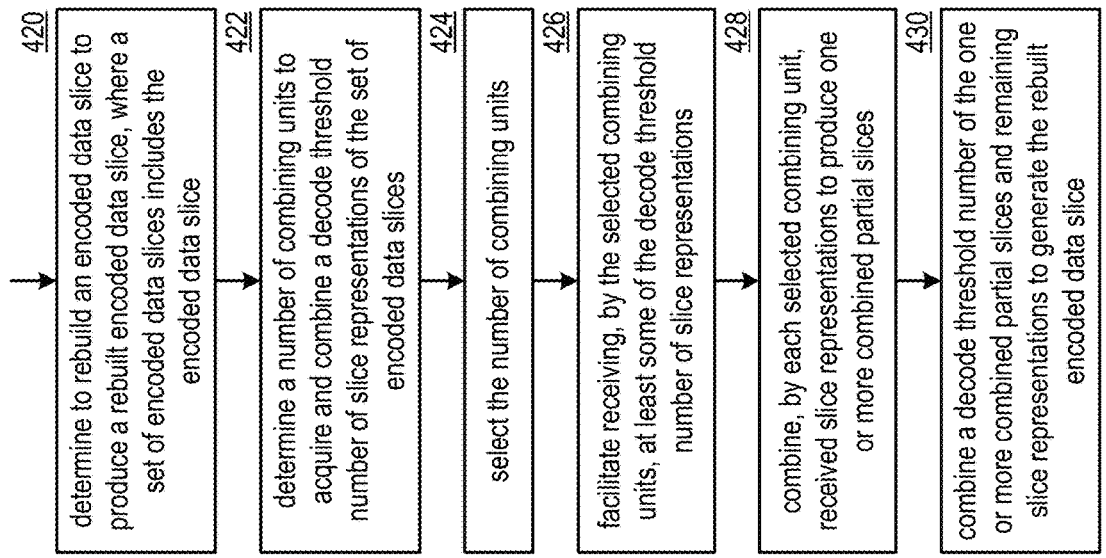
FIG. 6B is a flowchart illustrating an example of rebuilding data in accordance with the present invention.

FIG. 6B is a flowchart illustrating an example of rebuilding data. The method begins or continues at step 420 where a processing module of one or more processing modules of one or more computing devices of a dispersed storage network (DSN) determines to rebuild an encoded data slice to produce a rebuilt encoded data slice, where a set of encoded data slices includes the encoded data slice. The determining includes one or more of receiving a rebuilding request, detecting the storage error, identifying a slice name of the encoded data slice, and identifying an encoding matrix utilized to dispersed storage error encode a data segment to produce the set of encoded data slices.

The method continues at step 422 where the processing module determines a number of combining units to acquire and combine a decode threshold number of slice representations of the set of encoded data slices. The determining may be based on one or more of available storage units, a system configuration, a system loading level, combining unit loading levels, and a decode threshold number.

The method continues at step 424 where the processing module selects the number of combining units. The selecting may be based on one or more of storage unit availability levels, a site configuration, a system configuration, and the determined number of combining units. The selecting may further include issuing combining instructions to the selected number of combining units, where the combining instructions includes one or more of which slice representations the combine to produce a combined partial slice and which destination to send the combined partial slice.

The method continues at step 426 where the processing module facilitates receiving, by the selected combining units, at least some of the decode threshold number of slice representations. For example, the processing module assigns slice representations to the combining units and issues requests for the slice expectations to storage units. The storage units generate the slice representations and send the slice representations to the combining units and/or a rebuilding unit.

The method continues at step 428 where each selected combining unit combines received slice representations to produce one or more combined partial slices. For example, when receiving a partial decoded data slice as the sliced representation, the combining unit adds the representations in a field of arithmetic utilized to encode the set of encoded data slices to produce a combined partial slice and sends the combined partial slice to another combining unit or to the rebuilding unit.

The method continues at step 430 where the processing module combines a decode threshold number of the one or more combined parcel slices and remaining slice of representations to generate the rebuilt encoded data slice. For example, the processing module converts any remaining slice representations that are encoded data slices rather than partial slices into partial slices, and combines partial slices and combined partial slices in the field of arithmetic utilized to produce the set of encoded data slices to produce the rebuilt encoded data slice.

Figure 7A:
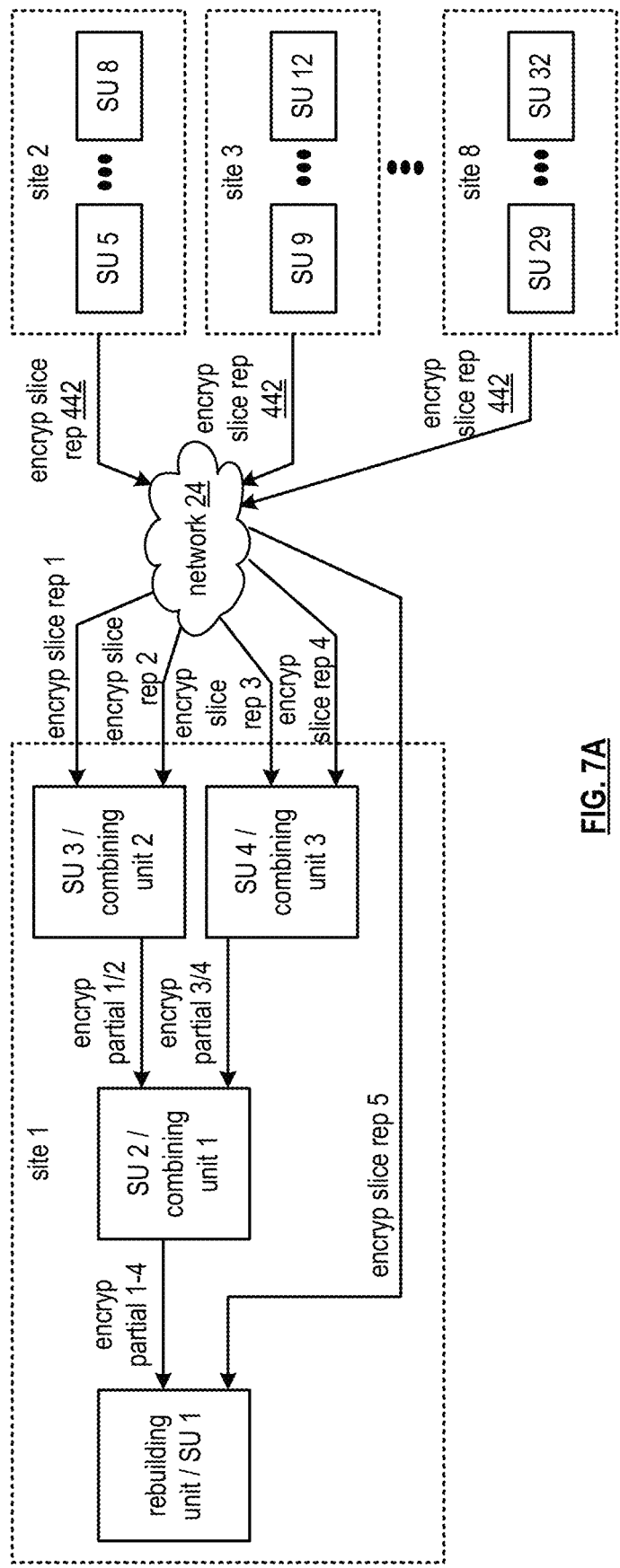
FIG. 7A is a schematic block diagram of another embodiment of a dispersed storage network in accordance with the present invention.

FIG. 7A is a schematic block diagram of another embodiment of a dispersed storage network that includes a plurality of sites and the network 24 of FIG. 1. Each site includes a plurality of storage units. Each storage unit may be implemented utilizing the distributed storage and task (DST) execution unit 36 of FIG. 1.

The DSN functions to store data, where the data is dispersed storage error encoded to produce a plurality of sets of encoded data slices for storage in the storage units and where each set of encoded data slices includes an information dispersal algorithm (IDA) width number of encoded data slices. The storage includes utilizing storage units associated with at least two sites to store a decode threshold number of encoded data slices of each set of encoded data slices, where the decode threshold number of encoded data slices are required to recover a corresponding data segment of the data. For example, recovery of one encoded data slice from a corresponding storage unit at each of 5 of 8 sites is required to recover the data when the set of encoded data slices is stored across 8 sites at one storage unit per site when the IDA width is 8 and the decode threshold is 5.

The DSN further functions to rebuild stored data when a storage error is detected. At least some of the storage units are operable to perform various functions to facilitate the rebuilding of the stored data. The various functions includes one or more of storing encoded data slices, retrieving an encoded data slice, detecting the storage error, generating a partially decoded encoded data slice (e.g., interchangeably referred to as a partial slice), generating one or more pairwise encryption keys, encrypting the partial slice to produce an encrypted partial slice as an encrypted slice representation 442 (e.g., interchangeably referred to as an encrypted partial slice), receiving encrypted partial slices, combining encrypted partial slices to produce further encrypted partial slices, generating an encrypted rebuilt encoded data slice, and decrypting the encrypted rebuilt encoded data slice to produce a rebuilt encoded data slice.

In an example of operation of the rebuilding of the stored data, the storage unit 1 determines to rebuild an encoded data slice associated with the storage error (e.g., a missing slice or corrupted slice is detected locally by the storage unit 1), where a data segment was dispersed storage error encoded to produce a set of encoded data slices that includes the encoded data slice. Having determined to rebuild the encoded data slice, the storage unit 1 executes further functions of a rebuilding unit as described below. Hereafter for this example, the storage unit 1 reference and the rebuilding unit reference may be utilized interchangeably.

Having determined to rebuild the encoded data slice associated with the storage error, the rebuilding unit determines a number of combining units to offload a burden of receiving slice representations to enable the rebuilding of the encoded data slice. The combining units includes storage units that are available to perform the receiving partial slices and the combining partial slices functions. The determining may be based on one or more of a number of available storage units at a common site with the rebuilding unit, system configuration information, the decode threshold number, and a performance goal. For example, the rebuilding unit determines to utilize three combining units when storage units 2-4 are available to perform combining unit functions.

Having determined the number of combining units, the rebuilding unit selects the combining units in accordance with the number of combining units and based on one or more of storage unit availability, local network available capacity, wide area network available capacity, and the system configuration. For instance, the rebuilding unit determines to utilize the storage units 2-4 as combining units 1-3 to receive 4 of 5 slice representations when the decode threshold is 5 and the storage units 2-4 are co-located at a common same site with the rebuilding unit. Hereafter for this example, storage units 2-4 may be referred to interchangeably as combining units 1-3.

Having selected the combining units, the rebuilding unit selects storage units to participate in the rebuilding as participants, where the participants stored the decode threshold number of encoded data slices. The selecting may be based on one or more of storage unit availability, a network performance level, interpreting an error message, initiating a query, receiving a query response, and a predetermination. For example, the rebuilding unit selects a storage unit at each of five sites from sites 2-8 as the participants.

Having selected the participants, the rebuilding unit facilitates establishing pairwise encryption keys between each of the participants and between the rebuilding unit and each of the participants. For example, the rebuilding unit issues encryption key generation instructions to each of the participants, each of the participants negotiate with each other to create a secret encryption key between them (e.g., utilizing Diffie Hellman), and each of the participants stores its pairwise encryption keys.

Having established the pairwise encryption keys, the rebuilding unit facilitates receiving, by the combining units and the rebuilding unit, encrypted slice representations 442 of the decode threshold number of encoded data slices of the set of encoded data slices. Each encrypted representation of an encoded data slice includes a corresponding encrypted partially decoded encoded data slice (e.g., encrypted partial slice) based on the encoded data slice of the participating storage error. For example, the rebuilding unit issues slice representation retrieval requests to the participating storage units of the DSN that stores the decode threshold number of encoded data slices, where the request includes one or more of a slice name of the encoded data slice of the storage error, a slice name of the encoded data slice of the request of slice representation, a partial decoding matrix, an encoding matrix, identifiers of the decode threshold number of encoded data slices, and a destination identifier for the encrypted slice representation (e.g., an identifier for a particular combining unit, an identifier of the rebuilding unit). For instance, the rebuilding unit issues, via the network 24, the decode threshold number of slice representation retrieval requests to the participating storage units at 5 other sites.

Each storage unit receiving a slice representation retrieval request generates a corresponding encrypted slice representation and sends, via the network 24, the encrypted slice representation to at least one of a corresponding combining unit and the rebuilding unit in accordance with an associated destination identifier. Alternatively, two storage units at a common site generate two encrypted partial slices, combine the two encrypted partial slices to generate an encrypted common partial slice, and send the encrypted common partial slice to the at least one of the corresponding combining unit and the rebuilding unit.

The storage unit generates each encrypted partial slice based on the request and a locally stored encoded data slice associated with the request. The generating of the encrypted partial slice includes one or more of obtaining an encoding matrix utilized to generate the locally stored encoded data slice (e.g., extract from the request, retrieve from a memory), reducing the encoding matrix to produce a square matrix that exclusively includes rows identified in the request (e.g., slice pillars associated with participating storage units of the decode threshold number of storage units), inverting the square matrix to produce an inverted matrix (e.g., alternatively, may extract the partial decoding matrix from the request as the inverted matrix), matrix multiplying the inverted matrix by the locally stored encoded data slice to produce a vector, matrix multiplying the vector by a row of the encoding matrix corresponding to the encoded data slice to be rebuilt (e.g., alternatively, may extract the row from the request), to produce the partial slice (e.g., encoded data slice to be rebuilt identified in the request), and partial slice with each key and stores associated with the other participating storage units and the rebuilding unit (e.g., performs an exclusive OR logical function on the partial slice, four encryption keys associated with other participating storage units, and the encryption key associated with the rebuilding unit).

Each of the combining units combine received encrypted slice representations to produce an encrypted combined partial slice. For example, each combining unit adds the received encrypted partial slices in a field of arithmetic utilized to encode a set of encoded data slices (e.g., exclusive OR logical function) to produce the encrypted combined partial slice. For instance, combining unit 2 performs the exclusive OR logical function on an encrypted partial slice 1 of encrypted slice representation 1 and an encrypted partial slice 2 of encrypted slice representation 2 to produce an encrypted combined partial slice 1/2, combining unit 3 performs the exclusive OR logical function on an encrypted partial slice 3 of slice representation 3 and an encrypted partial slice 4 of encrypted slice representation 4 to produce an encrypted combined partial slice 3/4.

As such, each combining unit receives two slice streams rather than the combining unit receiving five slice streams. The combining units may further operate in a sequential manner to further limit utilized inbound bandwidth utilization. For example, combining unit 1 performs the exclusive OR logical function on the encrypted combined partial slice 1/2 and the encrypted combine partial slice 3/4 to produce an encoded combined partial slice 1-4. Note that improved security is provided as the combining units have no knowledge of the pairwise encryption keys unless a combining unit is also a participating storage unit.

With the combining units providing at least one encrypted combined partial slice, the rebuilding unit combines all of one or more encrypted combined partial slices from the combining units and any further received encrypted slice representations to produce an encrypted rebuilt encoded data slice. For example, the rebuilding unit performs the exclusive OR logical function on the encrypted combined partial slice 1-4 and an encrypted partial slice 5 of a received encrypted slice representation 5 to produce the encrypted rebuilt encoded data slice when the received encrypted slice representation 5 includes the encrypted partial slice 5.

The rebuilding unit decrypts the encrypted rebuilt encoded data slice to produce the rebuilt encoded data slice. For example, the rebuilding unit adds the encrypted rebuilt encoded data slices and all of the pairwise encryption keys that the rebuilding unit knows that are associated with the participating storage units. For instance, the rebuilding unit performs the exclusive OR logical function on the received encrypted combined partial slices, the received encrypted partial slice, and the five pairwise encryption keys associated with the five participating storage units to produce the rebuilt encoded data slice. The rebuilding unit may subsequently store the rebuilt encoded data slice in the storage unit 1 to remedy the detected storage error.

Figure 7B:
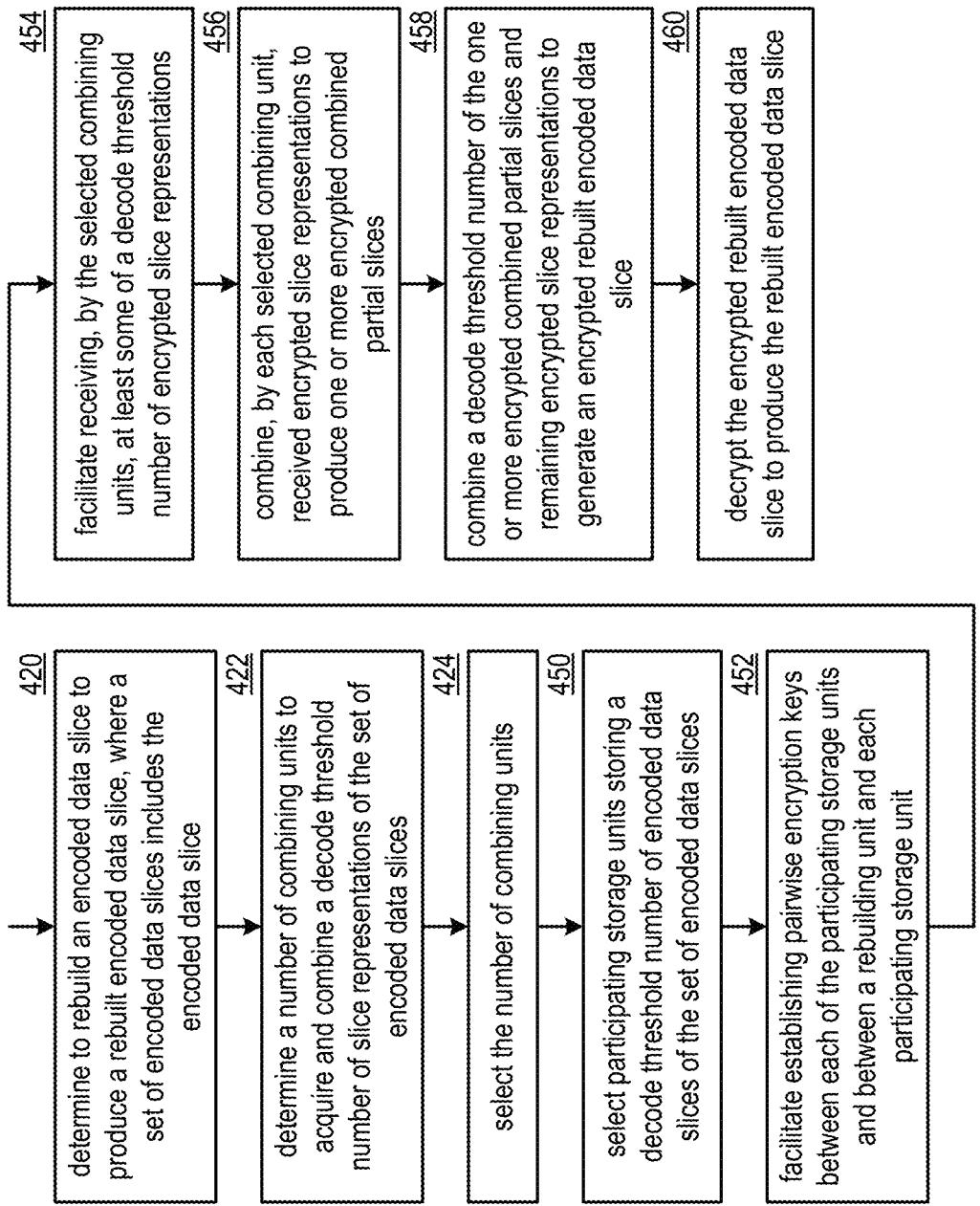
FIG. 7B is a flowchart illustrating another example of rebuilding data in accordance with the present invention.

FIG. 7B is a flowchart illustrating another example of rebuilding data, which include similar steps to FIG. 6B. The method begins with steps 420, 422, and 424 of FIG. 6B where a processing module of one or more processing modules of one or more computing devices of a dispersed storage network (DSN) determines to rebuild an encoded data slice to produce a rebuilt encoded data slice, determines a number of combining units to acquire and combine a decode threshold number of slice representations of the set of encoded data slices, and selects the number of combining units.

The method continues at step 450 where the processing module selects participating storage units that store a decode threshold number of encoded data slices of a set of encoded data slices that includes the encoded data slice to be rebuilt. The selecting may be based on one or more of a network performance level, a storage unit performance level, and a network configuration.

The method continues at step 452 where the processing module facilitates establishing pairwise encryption keys between each of the participating storage units and between a rebuilding unit and each participating storage unit. For example, the processing module issues instructions to the participating storage units and each storage unit negotiates (e.g., utilizing a Diffie Hellman approach) with each other storage unit and with the rebuilding unit to generate the pairwise encryption keys for local storage.

The method continues at step 454 where the processing module facilitates receiving, by the selected combining units, at least some of a decode threshold number of encrypted slice representations. For example, the processing module assigns encrypted slice representations to the combining units and issues requests for the encrypted slice representations to the participating storage units. The participating storage units generate the slice representations and send the slice representations to the combining units and/or a rebuilding unit.

The method continues at step 456 where each selected combining unit combines received encrypted slice representations to produce one or more encrypted combined partial slices. For example, when receiving an encrypted partial decoded data slice as the encrypted sliced representation, the combining unit adds the encrypted representations in a field of arithmetic utilized to encode the set of encoded data slices to produce an encrypted combined partial slice and sends the encrypted combined partial slice to another combining unit or to the rebuilding unit.

The method continues at step 458 where the processing module combines a decode threshold number of the one or more combined encrypted partial slices and remaining encrypted slice representations to generate an encrypted rebuilt encoded data slice. For example, the processing module adds (e.g., XOR) all the encrypted partial slices and encrypted combined partial slices in the arithmetic field utilized to produce the set of encoded data slices to produce the encrypted rebuilt encoded data slice.

The method continues at step 460 where the processing module decrypts the encrypted rebuilt encoded data slice to produce the rebuilt encoded data slice. For example, the processing module adds the encrypted rebuilt encoded data slice with all of the keys associated with the rebuilding unit and the participating storage units in the arithmetic field utilized to produce the set of encoded data slices. For instance, the processing module performs an exclusive OR function on the encrypted rebuilt encoded data slice and a decode threshold number of pairwise encryption keys associated with the decode threshold number of participating storage units to produce the rebuilt encoded data slice.

Figure 8A:
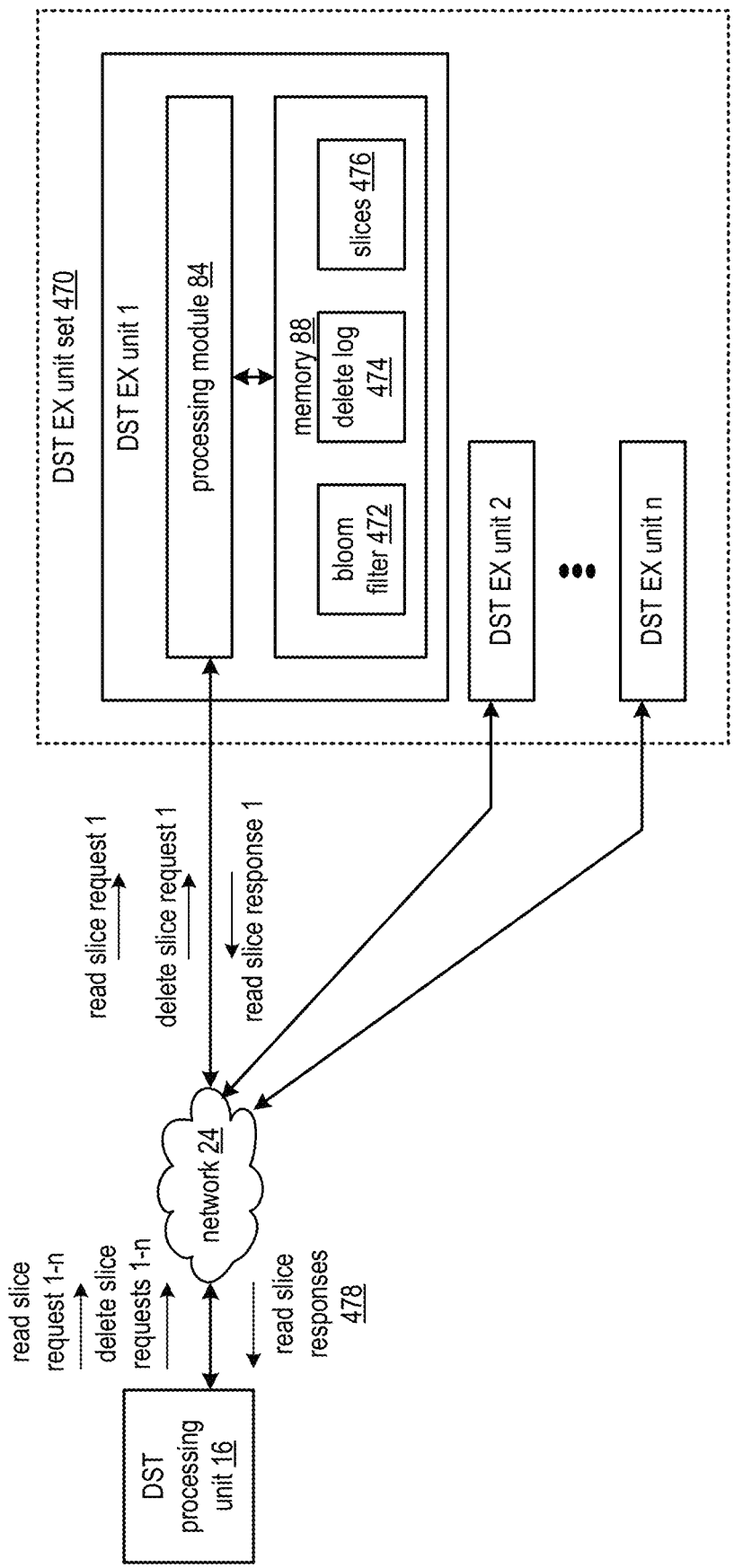
FIG. 8A is a schematic block diagram of another embodiment of a dispersed storage network in accordance with the present invention.

FIG. 8A is a schematic block diagram of another embodiment of a dispersed storage network that includes the distributed storage and task (DST) processing unit 16 of FIG. 1, the network 24 of FIG. 1, and a DST execution (EX) unit set 470. The DST execution unit set includes a set of DST execution units 1-*n*. Each DST execution unit may be implemented utilizing the DST execution unit 36 of FIG. 1. Each DST execution unit includes the processing module 84 and the memory 88 of FIG. 3.

The DSN functions to delete stored data from the DST execution unit set, where data is dispersed storage error encoded to produce a plurality of sets of encoded data slices 476 that are stored in memories 88 of the DST execution unit set. In an example of operation of the deleting of the stored data, the DST processing unit 16 issues, via the network 24, a set of delete slice requests 1-*n* to the DST execution units 1-*n*, where each delete slice request includes one or more of a slice name associated with a stored encoded data slice to be deleted and a revision level associated with the stored encoded data slice to be deleted.

The processing module 84 of each DST execution unit receiving a corresponding delete slice request determines whether to queue the delete slice request for subsequent execution. The determining may be based on a resource utilization level, a resource utilization goal level, a predetermination, and a number of queued delete slice requests. For example, the processing module 84 determines to queue the delete slice request when the resource utilization level is greater than a high resource utilization goal level.

When determining to queue the delete slice requests, the processing module 84 updates a delete log 474 within the memory 88 to include the delete slice request. For example, the processing module 84 adds the slice name and the revision level to a list of encoded data slices for deletion within the delete log 474. Having queued the delete slice request in the delete log 474, the processing module 84 updates a Bloom filter 472 within the memory 88 to indicate that the encoded data slice corresponding to the slice name and the revision level has been deleted (e.g., slated for eventual deletion). For example, the processing module 84 performs a deterministic function (e.g., a hashing function, a hash-based message authentication code function, a mask generating function, and a sponge function) on the slice name and the revision level to produce a new entry to add to a list within the Bloom filter 472.

Having updated the Bloom filter 472, the processing module 84 issues, via the network 24, a delete slice response to the DST processing unit 16, where the delete slice response indicates that the encoded data slice has been deleted. Having issued the delete slice response, the processing module 84 utilizes available resources to delete encoded data slices from the memory 88 in accordance with one or more entries of the delete log. Subsequent to deleting an encoded data slice, the processing module 84 updates the delete log. For example, the processing module 84 removes the revision number and further removes the slice name from the delete log when there are no other revisions to be deleted for the slice name.

The DST processing unit 16 issues, via the network 24, read slice requests 1-*n* to at least some of the DST EX units 1-*n* when desiring to retrieve other stored data. A processing module 84 of a DST execution unit receiving a read slice request for another encoded data slice determines whether the other encoded data slices probably deleted or definitely not deleted. The read slice request includes another slice name which may be the same or different as the slice name and another revision level which may be the same or different as the revision level. As a specific example of the determining, the processing module 84 accesses the Bloom filter 472 and indicates that the other encoded data slices probably deleted when the other slice name and other revision level exists within the Bloom filter 472 (e.g., a value produced by performing a deterministic function on the other slice name and the other revision level is substantially the same as a recovered entry from the Bloom filter). As another example, the processing module 84 accesses the Bloom filter 472 and indicates that the other encoded data slice is definitely not deleted when the other slice name and other revision level does not exist.

When the other encoded data slice is probably deleted, the processing module 84 verifies deletion. As a specific example of the verification, the processing module 84 accesses the delete log 474 and indicates that the other encoded data slice has been deleted when the other revision level and other slice name combination is not present. As another specific example of the verification, the processing module accesses the delete log 474 and indicates that the other encoded data slice has not been deleted when the other revision level and the other slice name combination is present.

When the other encoded data slice has been verified as deleted, the processing module 84 issues a read slice response 478 indicating that the other encoded data slice has been deleted. When the other encoded data slice has been verified as not deleted, the processing module 84 issues the read slice response 478 to the DST processing unit 16 to include a recovered other encoded data slice. For example, the processing module 84 recovers the other encoded data slice from the memory 88, generates the read slice response 478 to include the recovered other encoded data slice, and sends, via the network 24, the read slice response 478 to the DST processing unit 16. When the other encoded data slice is definitely not deleted, the processing module 84 issues the read slice response 478 to the DST processing unit 16 to include the recovered other encoded data slice.

Figure 8B:
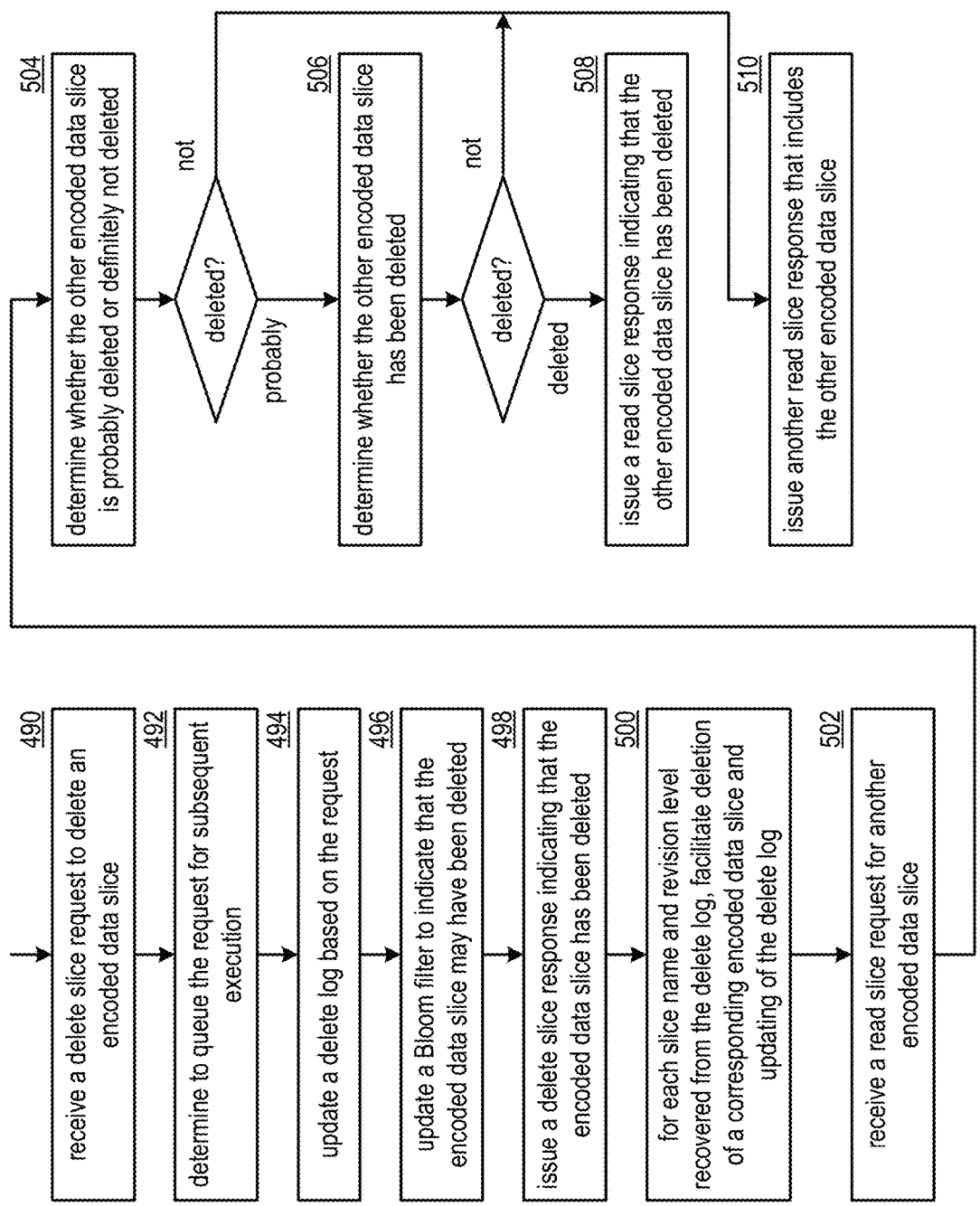
FIG. 8B is a flowchart illustrating an example of deleting data in accordance with the present invention.

FIG. 8B is a flowchart illustrating an example of deleting data. The method begins or continues at step 490 where a processing module (e.g., of a distributed storage and task (DST) execution (EX) unit) receives a delete slice request to delete an encoded data slice. The delete slice request includes one or more of a slice name, a revision level, and a requesting entity identifier. The method continues at step 492 where the processing module determines whether to queue the request for subsequent execution. For example, the processing module indicates to queue the delete slice request when determining that a level of available resources compares unfavorably to a minimum required resource level.

When queuing the delete slice request, the method continues at step 494 where the processing module updates a delete log based on the delete slice requests. For example, the processing module adds the slice name and the revision level to the delete log. The method continues at step 496 where the processing module updates a Bloom filter to indicate that the encoded data slice may have been deleted. For example, the processing module performs a hashing function on the slice name and the revision level to produce an entry and adds the entry to the Bloom filter.

The method continues at step 498 where the processing module issues a delete slice response to a requesting entity indicating that the encoded data slice has been deleted. For example, the processing module generates the delete slice response to include a slice name and a revision level and sends the delete slice response to the requesting entity.

For each slice name and revision level recovered from the delete log, the method continues at step 500 where the processing module facilitates deletion of a corresponding encoded data slice and updating of the delete log. As a specific example of the deleting, the processing module deletes a corresponding encoded data slice from a local memory based on available resources required to perform the deleting. As a specific example of the updating, the processing module removes the slice name and a revision level from the delete log. As yet another specific example of the updating, the processing module updates the delete log entry associated with the slice name and the revision level to indicate that the encoded data slice has been deleted.

The method continues at step 502 where the processing module receives a read slice request for another encoded data slice. The read slice request includes one or more of another slice name, another revision level, and another requesting entity identifier. The method continues at step 504 where the processing module determines whether the other encoded data slice is probably deleted or definitely not deleted. As a specific example, the processing module accesses the Bloom filter and indicates that the encoded data slice has probably been deleted when an entry corresponding to the other slice name and the other revision level exists. As another specific example, the processing module accesses the Bloom filter and indicates that the encoded data slice has definitely not been deleted when the entry corresponding to the other slice name and the other revision level does not exist.

The method branches to step 510 when the other encoded data slice is definitely not deleted. The method continues to step 506 when the encoded data slice is probably deleted. The method continues at step 506 where the processing module determines whether the other encoded data slice has been deleted when the encoded data slices probably deleted. For example, the processing module accesses the delete log and indicates not deleted when the other slice name and the other revision level exists. As another example, the processing module accesses the delete log and indicates deleted when the other slice name and the other revision level do not exist. The method branches to step 510 when the other encoded data slice has not been deleted. The method continues to step 508 when the other encoded data slice has been deleted. The method continues at step 508 where the processing module issues a read slice response to the other requesting entity, where the read slice response indicates that the other encoded data slice has been deleted.

The method continues at step 510 where the processing module issues another read slice response that includes the other encoded data slice when the other encoded data slice has not been deleted. For example, the processing module retrieves the other encoded data slice from the local memory, generates the read slice response to include the retrieved other encoded data slice, and sends the read slice response to the other requesting entity.

FIGS. 9A-B are schematic block diagrams of another embodiment of a dispersed storage network that includes a plurality of dispersed storage networks (DSNs) and the network 24 of FIG. 1. In an embodiment, the plurality of DSNs includes a dispersed storage network (DSN) A and a DSN B. The DSN A includes a DST processing unit A and a set of n distributed storage and task (DST) execution (EX) units A-1 through A-n. The DSN B includes a DST processing unit B and a set of n distributed storage and task (DST) execution (EX) units B-1 through B-n. Each DST processing unit A-B may be implemented utilizing the DST processing unit 16 of FIG. 1. Hereafter, each DST processing unit may be interchangeably referred to as a computing device. Each DST execution unit may be implemented utilizing the DST execution unit 36 of FIG. 1. Hereafter, each DST execution unit may be interchangeably referred to as a storage unit and each set of DST execution units may be interchangeably referred to as a set of storage units. The plurality of DSNs functions to coordinate storage of data in the plurality of DSNs.

FIG. 9A illustrates steps of an example of operation of the coordinating of the storing of the data where a first computing device of one or more computing devices of the DSN A receives a data segment of the data for storage. For example, the DST processing unit A (e.g., the first computing device) receives partitions received data R3 (e.g., a revision 3 of a data object) to produce a plurality of data segments that includes the data segment. Having received the data segment, the first computing device encodes the data segment using a dispersed storage error encoding function to produce a set of encoded data slices, where each DSN of the plurality of DSNs utilizes the dispersed storage error encoding function. For example, the DST processing unit A dispersed storage error encodes the data segment utilizing the dispersed storage error encoding function to produce the set of encoded data slices A-1 R3 through A-n R3 (e.g., revision 3 encoded data slices corresponding to the received division 3 of the data object).

Having produced the set of encoded data slices, the first computing device generates a set of DSN addresses for the set of encoded data slices using a deterministic function, where computing devices of other DSNs of the plurality of DSNs use the deterministic function to generate DSN addresses. For example, the DST processing unit A performs a deterministic function (e.g., a hashing function) on a data name associated with the data object to produce a DSN source name and generates a set of slice names as the set of DSN addresses for the set of encoded data slices A-1 R3 through A-n R3.

With the set of DSN addresses generated by the first computing device, a set of storage units of the DSN stores the set of encoded data slices in accordance with the set of DSN addresses. For example, the DST processing unit A issues a set of write slice requests to the DST execution units A-1 through A-n, where the set of write slice requests includes the set of DSN addresses and the set of encoded data slices A-1 R3 through A-n R3. DST execution units receiving the write slice requests facilitate storage of the set of encoded data slices A-1 R3 through A-n R3 (e.g., as the new slices of a new data revision). For instance, DST execution unit A-1 stores received encoded data slice A-1 R3, DST execution unit A-2 stores received encoded data slice A-2 R3, etc.

Having stored received encoded data slices, a first storage unit of the set of storage units and a first storage unit of another set of storage units of another DSN (e.g., DSN B) of the plurality of DSNs coordinates to store a copy of a first encoded data slice of the set of encoded data slices in the first storage units of both sets of storage units. For example, the DST execution unit A-1 of the DSN A and the DST execution unit B-1 of the DSN B coordinates to store a copy of the encoded data slice A-1 R3 in the DST execution unit A-1 and the DST execution unit B-1.

The coordinating between the first storage unit of the set of storage units and the first storage unit of the other set of storage units includes a variety of approaches. In a first approach of the coordinating, the first storage unit of the set of storage unit sends an indication of storing the first encoded data slice of the set of encoded data slices and in response to the indication, the first storage unit of the other set of storage units sends a read request to the first storage unit of the set of storage units. For example, the DST execution unit A-1 sends the indication of storing the encoded data slice A-1 R3 to the DST execution unit B-1, the DST execution unit B-1 sends the read request to the DST execution unit A-1, the DST execution unit A-1 sends, via the network 24, the encoded data slice A-1 R3 to the DST execution unit B-1 for storage.

In a second approach of the coordinating between the first storage unit of the set of storage units and the first storage unit of the other set of storage units, the first storage unit of the other set of storage units sends a list request to the first storage unit of the set of storage units and the first storage unit of the set of storage units sends a listing of encoded data slices stored by the first storage unit of the set of storage units to the first storage unit of the other set of storage units. The sending of the list request may be based on one or more of interpreting a synchronization schedule, estimating a time frame for the receiving of the data segment, interpreting an error message, and receiving a retrieval request for the data segment. For example, the DST execution unit B-1 issues, via the network 24, a list slice request 1 to the DST execution unit A-1, the DST execution unit A-1 generates a list slice response 1 that includes a listing of encoded data slices A-1 R1, B-1 R2, and A-1 R3, and the DST execution unit A-1 sends, via the network 24, the list slice response 1 to the DST execution unit B-1.

FIG. 9B illustrates further steps of the example of operation of the coordinating of the storing of the data where the first storage unit of the other set of storage units determines that the first storage unit of the other set of storage units is not currently storing the copy of the first encoded data slice of the set of encoded data slices. For example, the DST execution unit B-1 interprets the list slice response 1 of FIG. 9A to produce the DSN address (e.g., slice name) for the encoded data slice A-1 R3, and determines that the DST execution unit B-1 is not currently storing an encoded data slice that corresponds to the DSN address for the encoded data slice A-1 R3.

When the first storage unit of the other set of storage units is not currently storing the copy of the first encoded data slice of the set of encoded data slices, the first storage unit of the other set of storage units sends a read request to the first storage unit of the set of storage units. For example, the DST execution unit B-1 issues, via the network 24, a read slice request 1 to the DST execution unit A-1, where the read slice request 1 includes the DSN address for the encoded data slice A-1 R3, the DST execution unit A-1 issues, via the network 24, a read slice response 1 to the DST execution unit B-1, where the read slice response 1 includes the encoded data slice A-1 R3, and the DST execution unit B-1 stores the received encoded data slice A-1 R3.

In a similar fashion as described above, a second storage unit of the set of storage units and a second storage unit of the other set of storage units coordinate to store a copy of a second encoded data slice of the set of encoded data slices in the second storage units of both sets of storage units. For example, the DST execution unit A-2 coordinates to store a copy of the encoded data slice A-2 R3 in the DST execution unit B-2.

As yet another approach to the coordinating of storage of encoded data slices, a subset of storage units of the set of storage units coordinates with a corresponding subset of storage units of the other set of storage units to store a copy of a subset of encoded data slices of the set of encoded data slices in the subset of storage units of both sets of storage units, where a number of storage units in the subset of storage units is equal to or greater than a decode threshold number and is less than a pillar width number. The decode threshold number corresponds to a minimum number of encoded data slices of the set of encoded data slices required to recover the data segment and the pillar width number corresponds to a number of encoded data slices in the set of encoded data slices. For example, DST execution units A-1 through A-10 coordinates with DST execution units B-1 through B-10 to store a copy of encoded data slices A-1 R3 through A-10 R3 in DST execution units B-1 through B-10 when the number of storage units of the subset of storage units is equal to the decode threshold number and the decode threshold number is 10.

The coordinating may further include coordinating storage of another data segment of the plurality of data segments of the data. For example, the first and second storage units of the set of storage units verifies a common revision level (e.g., rev 3) of a first encoded data slice of another set of encoded data slices and of a second encoded data slice of the other set of encoded data slices, where the computing device encoded another data segment to produce the other set of encoded data slices. The coordinating may still further include a rebuilding. For example, when the revision level of the first encoded data slice of the other set of encoded data slices is less than the revision level of the second encoded data slice of the other set of encoded data slices, the DST processing unit A initiates a rebuilding for the first encoded data slice of the other set of encoded data slices, the first storage unit of the set of storage units stores a rebuilt first encoded data slices of the other set of encoded data slices, and the first storage unit of the set of storage units and the first storage unit of another set of storage units coordinate to store a copy of the rebuilt first encoded data slice of the other set of encoded data slices in the first storage units of both sets of storage units.

An example of operation of each DSN of the plurality of DSNs utilizing the dispersed storage error encoding function and the generating of DSN addresses using the deterministic function includes a plurality of steps. In a first step, a second computing device (e.g., DST processing unit B) of the other DSN of the plurality of DSNs receives a second data segment of second data for storage. For example, the DST processing unit B receives a data segment corresponding to a revision 2 of the data object. In a second step, the second computing device encodes the second data segment using the dispersed storage error encoding function to produce a second set of encoded data slices. For example, the DST processing unit B dispersed storage error encodes the second data segment of the revision 2 using the dispersed storage error encoding function to produce n encoded data slices B-1 R2 through B-n R2.

In a third step of the example, the second computing device generates a second set of DSN addresses for the second set of encoded data slices using the deterministic function. For example, the DST processing unit B performs the deterministic function on the data name of the data object to produce the source name and generates the second set of DSN addresses for the second set of encoded data slices. For instance, the second set of DSN addresses are substantially the same as the set of DSN addresses (e.g., with an exception of a revision 2 indicator). In a fourth step, the other set of storage units stores the second set of encoded data slices in accordance with the second set of DSN addresses. For example, the DST processing unit B facilitates storage of the encoded data slices B-1 R2 through B-n R2 in the DST execution units B-1 through B-n.

In a fifth step of the example, the first storage unit of the other set of storage units and the first storage unit of the set of storage units coordinate to store a copy of a first encoded data slice of the second set of encoded data slices in the first storage units of both sets of storage units. For example, the DST execution unit B-1 coordinates with the DST execution unit A-1 to store a copy of the encoded data slice B-1 R2 in the DST execution unit A-1. In a sixth step, the second storage unit of the other set of storage units and the second storage unit of the set of storage units coordinate to store a copy of a second encoded data slice of the second set of encoded data slices in the second storage units of both sets of storage units. For example, the DST execution unit B-2 coordinates with the DST execution unit A-2 to store a copy of the encoded data slice B-2 R2 in the DST execution unit A-2. The DST execution units of the DSN A and B may coordinate further to store remaining encoded data slices of the second set of encoded data slices in the remaining storage units of both sets of storage units (e.g., facilitating storage of encoded data slices B-3 R2 through B-n R2 in DST execution units A-3 through A-n.

FIG. 9C is a flowchart illustrating an example of coordinating storage of data in dispersed storage networks. The method includes step 530 where a first computing device of one or more computing devices of a dispersed storage network (DSN) of a plurality of DSNs receives a data segment of data for storage. For example, the first computing device receives the data and a data name of the data, and divides the data into a plurality of data segments that includes the data segment.

The method continues at step 532 where the first computing device encodes the data segment using a dispersed storage error encoding function to produce a set of encoded data slices, where each DSN of the plurality of DSNs utilizes the dispersed storage error encoding function. The method continues at step 534 where the first computing device generates a set of DSN addresses for the set of encoded data slices using a deterministic function, where computing devices of other DSNs of the plurality of DSNs use the deterministic function to generate DSN addresses. For example, the first computing device applies the deterministic function to the data name to produce a source name and generates the set of DSN addresses (e.g., slice names) utilizing the source name.

The method continues at step 536 where a set of storage units of the DSN stores the set of encoded data slices in accordance with the set of DSN addresses. For example, the first computing device sends the set of encoded data slices and the set of DSN addresses to be set of storage units of the DSN where the set of storage units stores the set of encoded data slices.

The method continues at step 538 where a first storage unit of the set of storage units and a first storage unit of another set of storage units of another DSN of the plurality of DSNs coordinate to store a copy of a first encoded data slice of the set of encoded data slices in the first storage units of both sets of storage units. The coordinating includes a variety of approaches. In a first approach, the first storage unit of the set of storage units sends an indication of storing the first encoded data slice of the set of encoded data slices and in response to the indication, the first storage unit of the other set of storage units sends a read request to the first storage unit of the set of storage units (e.g., to retrieve the copy of the first encoded data slice for storage in the first storage unit of the other set of storage units).

In a second approach of the variety of approaches of the coordinating, the first storage unit of the other set of storage units sends a list request to the first storage unit of the set of storage units, the first storage unit of the set of storage units sends a listing of encoded data slices stored by the first storage unit of the set of storage units to the first storage unit of the other set of storage units, the first storage unit of the other set of storage units determines that the first storage unit of the other set of storage units is not currently storing the copy of the first encoded data slice of the set of encoded data slices, and when the first storage unit of the other set of storage units is not currently storing the copy of the first encoded data slice of the set of encoded data slices, the first storage unit of the other set of storage units sends a read request to the first storage unit of the set of storage units (e.g., to retrieve the copy of the first encoded data slice for storage in the first storage unit of the other set of storage units). The method continues at step 540 where a second storage unit of the set of storage units coordinates with a second storage unit of the other set of storage units to store a copy of a second encoded data slice of the set of encoded data slice in the second storage units of both sets of storage units.

The method continues at step 542 where each of a subset of storage units of the set of storage units coordinates with a corresponding subset of storage units of the other set of storage units to store a copy of a subset of encoded data slices of the set of encoded data slices in the subset of storage units of both sets of storage units when a number of storage units in the subset of storage units are to coordinate. The number of storage units in the subset of storage units is equal to or greater than a decode threshold number and is less than a pillar width number. The decode threshold number corresponds to a minimum number of encoded data slices of the set of encoded data slices required to recover the data segment and the pillar width number corresponds to a number of encoded data slices in the set of encoded data slices.

The method continues at step 544 where the first and second storage units of the set of storage units verify (e.g., compare) a common revision level of a first encoded data slice of another set of encoded data slices and of a second encoded data slice of the other set of encoded data slices, where the computing device encoded another data segment to produce the other set of encoded data slices. When the revision level of the first encoded data slice of the other set of encoded data slices is less than the revision level of the second encoded data slice of the other set of encoded data slices, at least one of the first and second storage units facilitates initiating a rebuilding for the first encoded data slice of the other set of encoded data slices, the first storage unit of the set of storage units stores a rebuilt first encoded data slices of the other set of encoded data slices, and the first storage unit of the set of storage units and the first storage unit of another set of storage units coordinate to store a copy of the rebuilt first encoded data slice of the other set of encoded data slices in the first storage units of both sets of storage units.

The method continues at step 546 where a second computing device of the other DSN utilizes the dispersed storage error encoding function and the deterministic function. An example of operation of the utilizing of the dispersed storage error encoding function and the deterministic function includes a plurality of steps. In a first step, the second computing device of the other DSN of the plurality of DSNs receives a second data segment of second data for storage. In a second step, the second computing device encodes the second data segment using the dispersed storage error encoding function to produce a second set of encoded data slices. In a third step, the second computing device generates a second set of DSN addresses for the second set of encoded data slices using the deterministic function. In a fourth step, the other set of storage units stores the second set of encoded data slices in accordance with the second set of DSN addresses. In a fifth step, the first storage unit of the other set of storage units coordinates with the first storage unit of the set of storage units to store a copy of a first encoded data slice of the second set of encoded data slices in the first storage units of both sets of storage units. In a sixth step, the second storage unit of the other set of storage units coordinates with the second storage unit of the set of storage units to store a copy of a second encoded data slice of the second set of encoded data slice in the second storage units of both sets of storage units.

The method described above in conjunction with the processing module can alternatively be performed by other modules of the plurality of dispersed storage networks or by other devices. In addition, at least one memory section (e.g., a non-transitory computer readable storage medium) that stores operational instructions can, when executed by one or more processing modules of one or more computing devices of the plurality of dispersed storage networks, cause the one or more computing devices to perform any or all of the method steps described above.

FIG. 10A is a schematic block diagram of another embodiment of a dispersed storage network that includes distributed storage and task network (DSTN) modules A-B and the network 24 of FIG. 1. Each DSTN module includes a set of DST execution (EX) units, where a second set includes at least as many as a first set. For example, the DSTN module A includes DST execution units A-1 through A-n and DSTN module B includes DST execution units B-1 through B-n, where each set includes substantially the same number of DST execution units. Each DST execution unit may be implemented utilizing the DST execution unit 36 of FIG. 1.

The DSN functions to synchronize data stored in each DSTN module A-B such that each store substantially identical data. Such synchronization is facilitated in part by other units accessing the stored data utilizing a common information dispersal algorithm (IDA) decode threshold level and a common IDA width. The synchronization is further facilitated by utilizing a common naming strategy to associate the data with virtual DSN addresses such that a data object stored in one DSTN module utilizing a source name and a plurality of sets of slice names is substantially the same as storage of a copy of the data object stored in the other DSTN module utilizing the source name and the plurality of sets of slice names. As such, each DSTN module stores slices of the data and slices of any sort of DSN directory and/or dispersed hierarchical index utilized to associate the data with the virtual DSN addresses. The synchronization is still further facilitated by utilizing substantially identical DSN address ranges within the two sets of DST execution units.

The DSN further functions to rebuild an encoded data slice associated with a storage error. In an example of operation of the rebuilding of the encoded data slice, a DST execution unit identifies the encoded data slice associated with the storage error, where a data segment is dispersed storage error encoded to produce a set of encoded data slices that includes the encoded data slice. The identifying includes at least one of detecting a missing slice, detecting a corrupted slice, interpreting an error message, and receiving a rebuilding request.

Having identified the encoded data slice associated with the storage error, the DST execution unit determines whether to rebuild the identified encoded data slice. The determining may be based on interpreting a delete marker copied amongst the two or more DSTN modules, where the delete marker indicates that the encoded data slice is to be deleted. For example, the DST execution unit indicates to rebuild the identified encoded data slice when a delete marker corresponding to the encoded data slice is not found.

When rebuilding the encoded data slice, the DST execution unit determines whether a copy of the encoded data slice is available from the least one of other DSTN module. For example, the DST execution unit A-1 issues, via the network 24, a read slice request to the DST execution unit B-1 for the encoded data slice, interprets a read slice response, and indicates that the encoded data slice is available from the other DSTN module when the read slice response includes a copy of encoded data slice. Alternatively, the DST execution unit A-1 indicates that the encoded data slices not available from the other DSTN module when the read slice response does not include the copy of the encoded data slice.

When the encoded data slice is available from the other DSTN module, the DST execution unit obtains the encoded data slice from the other DSTN module and stores the encoded data slice. For example, the DST execution unit A-1 extracts the copy of the encoded data slice from the read slice response and stores the extracted and encoded data slice in a local memory of the DST execution unit A-1.

When the encoded data slices not available from the other DSTN module, the DST execution unit determines whether a decode threshold number of encoded data slices of the set of encoded data slices that includes encoded data slice is available from a local DSTN module associated with the DST execution unit. For example, the DST execution unit A-1 issues, via the network 24, at least a decode threshold number of read slice requests to other DST execution units of the DSTN module A, receives read slice responses, and indicates that the encoded data slices are available from the local DSTN module when the decode threshold number of encoded data slices of the set of encoded data slices is received from the received read slice responses.

When the decode threshold number of encoded data slices are available from the local DSTN module, the DST execution unit facilitates producing a rebuilt encoded data slice utilizing the decode threshold number of encoded data slices from the local DSTN module. For example, the DST execution unit A-1 dispersed storage error decodes the decode threshold number of encoded data slices to reproduce a data segment, and dispersed storage error encodes the reproduced data segment to produce the rebuilt encoded data slice.

When the decode threshold number of encoded data slices are not available from the local DSTN module, the DST execution unit facilitates producing the rebuilt encoded data slice utilizing a decode threshold number of encoded data slices of the set of encoded data slices and one or more other sets of encoded data slices corresponding to the set of encoded data slices, where the one or more other sets of encoded data slices are stored in one or more of the other DSTN modules. For example, the DST execution unit A-1 issues the decode threshold number of read slice requests to DST execution units of the DSTN module A and DST execution units of the DSTN module B, receives the decode threshold number of encoded data slices, dispersed storage error decodes the received decode threshold number of encoded data slices to reproduce the data segment, and dispersed storage error encodes the reproduced data segment to produce the rebuilt encoded data slice. As such, the DST execution unit may be able to rebuild encoded data slice even when each DSTN module stores less than the decode threshold number of encoded data slices but together provides the decode threshold number of encoded data slices.

FIG. 10B is a flowchart illustrating another example of rebuilding data. The method includes step 560 where a processing module (e.g., of a distributed storage and task (DST) execution unit) identifies an encoded data slice associated with a storage error. The identifying includes at least one of detecting a corrupted slice, identifying a missing slice, interpreting an error message, and receiving a rebuilding request. The method continues at step 562 where the processing module determines whether to rebuild the identified encoded data slice. The determining includes indicating to rebuild when the encoded data slice is to be maintained (e.g., a delete marker for the encoded data slice is not detected).

When rebuilding, the method continues at step 564 where the processing module determines whether a copy of the identified encoded data slice is available from the least one other DSTN module. For example, the processing module issues read slice requests to one or more DSTN modules, interprets one or more received read slice responses and indicates that the copy of the encoded data slice is not available when none of responses includes a copy of the identified encoded data slice. The method branches to step 570 when the copy of the identified encoded data slice is not available from the at least one other DSTN module. The method continues to step 568 when the copy of the identified encoded data slices available. The method continues at step 568 where the processing module obtains the encoded data slice from the other DSTN module and stores the encoded data slice in a memory of a local DSTN module when the copy of the identified encoded data slice is available from the at least one other DSTN module.

When the copy of the identified encoded data slice is not available from the at least one other DST and module, the method continues at step 570 where the processing module determines whether a decode threshold number of encoded data slices is available from the local DSTN module. For example, the processing module issues at least a decode threshold number of read slice requests to storage units of the local DSTN module and interprets received read slice responses. The method branches to step 574 when the decode threshold number of encoded data slices are not available from the local DSTN module. The method continues to step 572 when the decode threshold number of encoded data slices are available from the local DSTN module. When the decode threshold number of encoded data slices are available from the local DSTN module, the method continues at step 572 where the processing module facilitates producing a rebuilt encoded data slice utilizing encoded data slices from the local DSTN module and stores the rebuilt encoded data slice in the memory of the local DSTN module.

When the decode threshold number of encoded data slices are not available from the local DSTN module, the method continues at step 574 where the processing module facilitates producing the rebuilt encoded data slice utilizing a decode threshold number of encoded data slices from two or more DSTN modules and stores the rebuilt encoded data slice of a memory of the local DSTN module. For example, the processing module issues read slice requests to the two or more DSTN modules, dispersed storage error decodes the decode threshold number of encoded data slices to reproduce the data segment, dispersed storage error encodes the reproduced data segment to produce the rebuilt encoded data slice, and stores the rebuilt encoded data slice and a corresponding storage unit of the local DSTN module.

FIG. 11A is a schematic block diagram of another embodiment of a dispersed storage network (DSN) that includes a set of storage unit subsets 1-*n*, the network 24 of FIG. 1, and the distributed storage and task (DST) processing unit 16 of FIG. 1. Each storage unit subset includes a subset of DST execution (EX) units 1-S. Each DST execution unit may be implemented utilizing the DST execution unit 36 of FIG. 1.

The DSN functions to store data in at least some of the storage unit subsets 1-*n*, where the data is dispersed storage error encoded to produce a plurality of sets of encoded data slices for storage in the storage unit subsets 1-*n*. In an example of operation of the storing of the data, the DST processing unit 16 receives a store data request 580, where the store data request 580 includes one or more of the data, a data identifier, and a requesting entity identifier. Having received the data, the DST processing unit 16 dispersed storage error encodes the data to produce the plurality of sets of encoded data slices.

Having produced the plurality of sets of encoded data slices, the DST processing unit 16 generates at least one set of write slice requests, where the at least one set of write slice requests includes the plurality of sets of encoded data slices. For each storage unit subset, the DST processing unit 16 identifies a DST execution unit to be associated with a subset slice access process. The identifying may be based on one or more of interpreting system registry information, initiating a query, interpreting a query response, utilizing a predetermination, and using an identifier of a request. For example, the DST processing unit 16 identifies DST execution unit 1-2 of the storage unit subset 1, DST execution unit 2-5 of the storage unit subset 2, etc.

For each identified DST execution unit, the DST processing unit 16 sends, via the network 24, a corresponding write slice request of the at least one set of write slice requests to the identified DST execution unit. For example, the DST processing unit 16 sends, via the network 24, a first write slice request to the DST execution unit 1-2, where the request includes encoded data slice 1 of a first set of encoded data slices.

Each identified DST execution unit receiving a corresponding write slice request stores one or more encoded data slices of the received write slice request in a local memory associated with the identify DST execution unit. Each identified DST execution unit receiving the corresponding write slice request facilitates synchronization of storage of the one or more encoded data slices of the received write slice request amongst the local memory of the identified DST execution unit and remaining storage units of the storage unit subset. For example, DST execution unit 1-2 sends the one or more encoded data slices of the received write slice request to DST execution unit 1-1, DST execution unit 1-3 through DST execution unit 1-S of the storage unit subset 1 for storage. From time to time, each of the DST execution units of a common storage unit subset facilitate maintaining synchronization of stored encoded data slices such that each of the DST execution units of the common storage unit subset story substantially all of the same encoded data slices.

The DSN further functions to retrieve the stored data from the storage unit subsets. In an example of operation, the DST processing unit 16 sends at least a decode threshold number of read slice requests to a read threshold number of the storage unit subsets. As a specific example, the DST processing unit 16 sends a first read slice request to the identified DST execution unit 1-2 at the storage unit subset 1. As another specific example, the DST processing unit 16 sends the first read slice request to any remaining DST execution unit of the storage unit subset 1. When a DST execution unit receives a read slice request, the DST execution unit determines whether an associated local memory of the DST execution unit stores a desired encoded data slice of the read slice request. The DST execution unit issues a read slice response to the DST processing unit 16 when the DST execution unit recovers the desired encoded data slice from the associated local memory of the DST execution unit. Alternatively, the DST execution unit obtains the desired encoded data slice from another DST execution unit of a common storage unit subset and issues the read slice requests to the DST processing unit 16 utilizing the obtained encoded data slice. As another specific example, the DST execution unit forwards the read slice request to at least one other DST execution unit of the common storage unit subset when the DST execution unit determines that the desired encoded data slice is that stored in the local memory of the DST execution unit.

FIG. 11B is a flowchart illustrating an example of storing data. The method includes step 582 where a processing module of one or more processing modules of one or more computing devices of a dispersed storage network (DSN) dispersed storage error encodes a data segment to produce a set of encoded data slices. For example, the processing module divides received data into a plurality of data segments that includes the data segment.

The method continues at step 584 where the processing module generates a set of write slice requests that includes the set of encoded data slices. For example, the processing module generates a set of slice names and generates the set of write slice requests to include the set of slice names and the set of encoded data slices.

For each write slice request, the method continues at step 586 where the processing module identifies an associated storage unit's subset. The identifying includes at least one of interpreting a system registry, issuing a query, interpreting a query response, utilizing a predetermination, receiving a request, and interpreting a status message.

For each identified storage unit subset, the method continues at step 588 where the processing module identifies a primary storage unit of two or more storage units associated with the identified storage unit subset. The identifying includes at least one of interpreting a system registry, issuing a query, interpreting a query response, utilizing a predetermination, receiving a request, and interpreting a status message.

For each write slice request, the method continues at step 590 where the processing module sends the write slice request to a corresponding identified primary storage unit. The method continues at step 592 where each corresponding identified primary storage unit synchronizes storage of a corresponding encoded data slice from the write slice request in the two or more storage units associated with the storage unit subset that includes the primary storage unit. For example, the primary storage unit stores the encoded data slice in a local memory of the primary storage unit and issues write slice requests to remaining storage unit of the storage unit subset, where the write slice request includes copies of encoded data slice. From time to time, one or more of the storage units of the storage unit subset facilitate synchronization of stored encoded data slices among substantially all of the storage units of the storage unit subset.

FIG. 12A is a schematic block diagram of another embodiment of a dispersed storage network (DSN) that includes the distributed storage and task (DST) processing unit 16 of FIG. 1, distributed storage and task network (DSTN) modules A and B, and the network 24 of FIG. 1. Each DSTN module includes a set of DST execution (EX) units 1-*n*. Each DST execution unit may be implemented utilizing the DST execution unit 36 of FIG. 1.

The DSN functions to retrieve stored data, where the data is dispersed storage error encoded to produce a plurality of sets of encoded data slices for storage in at least one of the DSTN modules where copies of at least some of the plurality of sets of encoded data slices are subsequently stored in another DSTN module in accordance with synchronization of stored encoded data slices as previously discussed. In an example of operation, the DST processing unit 16 receives a retrieve data request 600, where the retrieve data request 600 includes one or more of a requesting entity identifier, and a data identifier associated with stored data for retrieval.

Having received the retrieve data request 600, the DST processing unit 16 issues, via the network 24, read slice requests to at least some of the set of DST execution units A-1 through A-*n* of the DSTN module A. For example, the DST processing unit 16 identifies slice names associated with the stored data based on the identifier of the data, generates the read slice requests to include at least some of the identified slice names, identifies the set of DST execution units A-1 through A-*n* (e.g., a lookup based on slice names), and sends, via the network 24, the read slice requests to the at least some of the identified DST execution units.

Having issued the read slice requests, each DST execution unit receiving a corresponding read slice request determines whether a requested encoded data slice is available from the local memory. For example, DST execution unit A-1 determines that the encoded data slice 1 is unavailable, DST execution unit A-2 determines that the encoded data slice 2 is available, etc. When the DST execution unit determines that the requested encoded data slices unavailable from the local memory of the DST execution unit, the DST execution unit identifies another DST execution unit associated with the unavailable encoded data slice. The determining may be based on one or more of interpreting a system registry, issuing a query, interpreting a received query response, a predetermination, performing a table lookup, and receiving a request. For example, the DST execution unit A-1 determines that a copy of the encoded data slice 1 is available from the DST execution unit B-1 of the DSTN module B.

Having identified the other DST execution unit, the DST execution unit issues, via the network 24, a read slice request for the unavailable encoded data slice to the identified other DST execution unit. For example, the DST execution unit A-1 issues, via the network 24, a read slice request to the DST execution unit B-1, where the read slice request includes a slice name associated with the encoded data slice 1. In response to receiving the read slice request, the other DST execution unit issues, via the network 24, a read slice response to the DST execution unit, where the DST execution unit includes the copy of the encoded data slice.

Having received the copy of the encoded data slice, the DST execution unit issues, via the network 24, another read slice response to the DST processing unit 16, where the other read slice response includes the copy of the encoded data slice. Subsequent to receiving the copy of the encoded data slice, the DST execution unit may further store the received copy of the encoded data slice in the local memory of the DST execution unit. For example, DST execution unit A-1 stores the copy of encoded data slice 1 in the local memory of the DST execution unit A-1.

Having received read slice responses from some of the DST execution units of the DSTN module A, the DST processing unit 16 dispersed storage error decodes a decode threshold number of received encoded data slices (e.g., including the copy of encoded data slice) to reproduce the data. Having reproduced the data, the DST processing unit 16 issues a retrieve data response 602 to a requesting entity, where the retrieve data response 602 includes the reproduced data.

FIG. 12B is a flowchart illustrating an example of retrieving stored data. The method includes step 610 where a processing module of one or more processing modules of one or more computing devices of a dispersed storage network (DSN) issues a set of read slice requests to a first set of storage units to initiate recovering data. For example, the processing module receives a retrieve data request, identifies slice names associated with data of the request, generates the set of read slice requests to include the slice names, identifies the first set of storage units, and sends the read slice requests to the identified first set of storage units.

The method continues at step 612 where a storage unit of the first set of storage units determines that a requested encoded data slices unavailable. For example, the storage unit identifies a storage error (e.g., missing, corrupted) associated with the encoded data slice based on a slice name of a received read slice request. The method continues at step 614 where the storage unit of the first set of storage units identifies a storage unit of a second set of storage units associated with the unavailable encoded data slice, where the first set of storage units and the second set of storage units store a plurality of substantially identical sets of encoded data slices associated with the data. The identifying includes at least one of issuing a query, interpreting a query response, performing a lookup, interpreting a system registry, and receiving a request.

The method continues at step 616 where the storage unit of the first set of storage units obtains a copy of the unavailable encoded data slice from the identified storage unit of the second set of storage units. For example, the processing module issues a read slice request to the identified storage unit of the second set of storage units, where the read slice request includes the slice name of the unavailable encoded data slices, and receives a read slice response that includes a copy of the encoded data slice. The obtaining may further include the storage unit of the first set of storage units storing the copy of the unavailable encoded data slice in a local memory of the storage unit of the first set of storage units.

The method continues at step 618 where the processing module disperse storage error decodes a decode threshold number of received encoded data slices (e.g., from storage units of the first set of storage units) to reproduce the data, where the received encoded data slices includes the copy of the unavailable encoded data slice. For example, the processing module receives the copy of the encoded data slice, and receives other encoded data slices of the set of encoded data slices associated with the copy of the encoded data slice, selects the decode threshold number of received encoded data slices, and disperse storage error decodes the selected decode threshold number of received encoded data slices to reproduce the data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a storage network, the method comprises:

transmitting a plurality of list slice requests to a plurality of storage units of a storage network storage pool, wherein each list slice request of the plurality of list slice requests is directed at a storage unit of the storage network storage pool associated with a first data segment of a set of data segments;

receiving one or more list slice response messages of a plurality of list slice response messages from the plurality of storage units of the storage network, wherein each list slice response message of the plurality of list slice response messages is associated with a list slice requests of the plurality of list slice requests;

determining whether a first threshold number of error-free encoded data slices (EDSs) associated with the first data segment has been stored in the plurality of storage units of the storage network;

in response to a determination that a first threshold number of error-free dispersed storage error EDSs has been stored in the plurality of storage units of the storage network, assigning a first rebuilding priority to the first data segment;

in response to a determination that the first threshold number of error-free dispersed storage error EDSs has not been stored in the plurality of storage units of the storage network, determining whether a second threshold number of error-free dispersed storage error EDSs has been stored in the plurality of storage units of the storage network;

in response to a determination that the second threshold number of error-free dispersed storage error EDSs has been stored in the plurality of storage units of the storage network, assigning a second rebuilding priority to the first data segment; and in response to a determination that a number of error-free dispersed storage error EDSs is between the first threshold number of error-free dispersed storage error EDSs and the second threshold number of error-free dispersed storage error EDSs, issuing a decode threshold number of read slice requests to storage units known to store available error-free EDSs; and rebuilding one or more dispersed storage error EDSs associated with the first data segment that are not error-free.

2. The method of claim 1, wherein the first threshold number of error-free EDSs associated with the first data segment is a number of error-free EDSs that is less than an information dispersal algorithm (IDA) width number of dispersed storage error EDSs.

3. The method of claim 2, wherein the second threshold number of error-free dispersed storage error EDSs is less than an information dispersal algorithm (IDA) width number of dispersed storage error EDSs and less than the first threshold number of error-free dispersed storage error EDSs.

4. The method of claim 2, wherein the first threshold number of error-free dispersed storage error EDSs is greater than a read threshold number of EDSs, wherein a read threshold number of EDSs is a minimum number of EDSs required to reconstruct the first data segment.

5. The method of claim 4, wherein the first threshold number of error-free dispersed storage error EDSs plus the read threshold number of EDSs is greater than an IDA width number of dispersed storage error EDSs.

6. The method of claim 5, wherein the read threshold number of EDSs is equal to or greater than a decode threshold number of EDSs, wherein the decode threshold number of EDS is a number of EDSs per set of EDSs required to reconstruct a data object, wherein the data object is segmented into the set of data segments, wherein a set of EDSs is associated with the first segment.

7. The method of claim 1, further comprising:
transmitting at least a second threshold number of list slice message requests to the plurality of storage units of the storage network, wherein the at least a second threshold number of list slice message requests is associated with a second data segment;
receiving a second plurality of list slice response messages from the plurality of storage units of the storage network, wherein a number of list slice response messages are associated with the second threshold number of list slice message requests;
determining, based on the second plurality of list slice response messages received from the plurality of storage units of the storage network, whether the first threshold number of error-free dispersed storage error EDSs associated with the second threshold number of list slice message requests has been stored in the plurality of storage units of the storage network;
in response to a determination that the first threshold number of error-free dispersed storage error EDSs associated with the second threshold number of list slice message requests has been stored in the plurality of storage units of the storage network, assigning the first rebuilding priority to the first data segment;
in response to a determination that the first threshold number of error-free dispersed storage error EDSs associated with the second threshold number of list slice message requests has not been stored in the plurality of storage units of the storage network, determining whether the second threshold number of error-free dispersed storage error EDSs associated with the second threshold number of list slice message requests has been stored in the plurality of storage units of the storage network;
in response to a determination that the second threshold number of error-free dispersed storage error EDSs associated with the second threshold number of list slice message requests has been stored in the plurality of storage units of the storage network, assigning a second rebuilding priority to the first data segment; and
in response to a determination that the number of error-free dispersed storage error EDSs associated with the second threshold number of list slice message requests is between the first threshold number of error-free dispersed storage error EDSs associated with the second threshold number of list slice message requests and the second threshold number of error-free dispersed storage error EDSs associated with the second threshold number of list slice message requests, issuing a decode threshold number of read slice requests to storage units known to store available error-free EDSs associated with the second threshold number of list slice message requests; and rebuilding one or more dispersed storage error EDSs associated with the second data segment that are not error-free.

8. The method of claim 1, further comprising:
identifying, based on the plurality of list slice response messages received from the plurality of storage units of the storage network, storage errors associated with one or more EDSs of the first data segment, wherein the identifying storage errors is based on at least one of comparing of a list slice response message of the plurality of list slice response messages to an expected list slice response message, receiving an error message, and receiving a rebuilding request.

9. The method of claim 1, wherein each list slice message includes an indicator of a storage error in a storage unit associated with the first data segment.

10. A computing device comprising:
an interface configured to interface and communicate with a storage network;
memory that stores operational instructions;
a processing module operably coupled to the interface and to the memory, wherein the processing module, when operable within the computing device based on the operational instructions, is configured to:
transmit a plurality of list slice requests to a plurality of storage units of a storage network storage pool, wherein each list slice request of the plurality of list slice requests is directed at a storage unit of the storage network storage pool associated with a first data segment of a set of data segments;
receive one or more list slice response messages of a plurality of list slice response messages from the plurality of storage units of the storage network, wherein each list slice response message of the plurality of list slice response messages is associated with a list slice requests of the plurality of list slice requests;
determine whether a first threshold number of error-free encoded data slices (EDSs) associated with the first data segment has been stored in the plurality of storage units of the storage network;
in response to a determination that a first threshold number of error-free dispersed storage error EDSs has been stored in the plurality of storage units of the storage network, assign a first rebuilding priority to the first data segment;
in response to a determination that the first threshold number of error-free dispersed storage error EDSs has not been stored in the plurality of storage units of the DSN, determine whether a second threshold number of error-free dispersed storage error EDSs has been stored in the plurality of storage units of the storage network;
in response to a determination that the second threshold number of error-free dispersed storage error EDSs has been stored in the plurality of storage units of the storage network, assign a second rebuilding priority to the first data segment; and
in response to a determination that a number of error-free dispersed storage error EDSs is between the first threshold number of error-free dispersed storage error EDSs and the second threshold number of error-free dispersed storage error EDSs, issue a decode threshold number of read slice requests to storage units known to store available error-free EDSs; and rebuild one or more dispersed storage error EDSs associated with the first data segment that are not error-free.

11. The computing device of claim 10, wherein the processing module, when operable within the computing device based on the operational instructions, is further configured to:
in response to a determination that the second threshold number of error-free dispersed storage error EDSs has not been stored in the plurality of storage units of the DSN, determine whether a third threshold number of error-free dispersed storage error EDSs has been stored in the plurality of storage units of the storage network; and
in response to a determination that the number of error-free dispersed storage error EDSs is between the second threshold number of error-free dispersed storage error EDSs and the third threshold number of error-free dispersed storage error EDSs, issue one or more read slice requests to storage units known to store available error-free EDSs; and
rebuild one or more dispersed storage error EDSs associated with the first data segment that are not error-free.

12. The computing device of claim 10, wherein the processing module, when operable within the computing device based on the operational instructions, is further configured to:
transmit at least a second threshold number of list slice message requests to the plurality of storage units of the storage network, wherein the at least a second threshold number of list slice message requests is associated with a second data segment;
receive a second plurality of list slice response messages from the plurality of storage units of the storage network, wherein the second plurality of list slice response messages are associated with the second threshold number of list slice message requests;
determine, based on the plurality of list slice response messages received from the plurality of storage units of the storage network, whether the first threshold number of error-free dispersed storage error EDSs associated with the second threshold number of list slice message requests has been stored in the plurality of storage units of the storage network;
in response to a determination that the first threshold number of error-free dispersed storage error EDSs associated with the second threshold number of list slice message requests has been stored in the plurality of storage units of the storage network, assign the first rebuilding priority to the first data segment;
in response to a determination that the first threshold number of error-free dispersed storage error EDSs associated with the second threshold number of list slice message requests has not been stored in the plurality of storage units of the storage network, determine whether the second threshold number of error-free dispersed storage error EDSs associated with the second threshold number of list slice message requests has been stored in the plurality of storage units of the storage network;
in response to a determination that the second threshold number of error-free dispersed storage error EDSs associated with the second threshold number of list slice message requests has been stored in the plurality of storage units of the storage network, assign a second rebuilding priority to the first data segment; and when a number of error-free dispersed storage error EDSs associated with the second threshold number of list slice message requests is between the first threshold number of error-free dispersed storage error EDSs associated with the second threshold number of list slice message requests and the second threshold number of error-free dispersed storage error EDSs associated with the second threshold number of list slice message requests, issue a decode threshold number of read slice requests to storage units known to store available error-free EDSs associated with the second threshold number of list slice message requests; and
rebuild one or more dispersed storage error EDSs associated with the second data segment that are not error-free.

13. The computing device of claim 10, wherein the storage network includes a plurality of storage sites and the plurality of storage units of the storage network are distributed between at least two of the plurality of storage sites and further wherein each of the at least two of the plurality of storage sites includes a number of storage units sufficient to store each of the second threshold number of error-free dispersed storage error EDSs in a separate storage unit.

14. The computing device of claim 10, wherein the first threshold number of error-free dispersed storage error EDSs is less than an information dispersal algorithm (IDA) width number of dispersed storage error EDSs.

15. The computing device of claim 14, wherein the first threshold number of error-free dispersed storage error EDSs is greater than a read threshold number of EDSs, wherein a read threshold number of EDSs is a minimum number of EDSs required to reconstruct the first data segment and wherein the first threshold number of error-free dispersed storage error EDSs plus the read threshold number of EDSs is greater than an IDA width number of dispersed storage error EDSs.

16. The computing device of claim 15, wherein the read threshold number of EDSs is equal to or greater than a decode threshold number of EDSs, wherein the decode threshold number of EDS is a number of EDSs per set of EDSs required to reconstruct a data object, wherein the data object is segmented into the set of data segments, wherein a set of EDSs is associated with the first segment.

17. The computing device of claim 10, wherein the second threshold number of error-free dispersed storage error EDSs is less than an information dispersal algorithm (IDA) width number of dispersed storage error EDSs and less than the first threshold number of error-free dispersed storage error EDSs.

18. The computing device of claim 10, wherein the processing module, when operable within the computing device based on the operational instructions, is further configured to:
rebuild a number of dispersed storage error EDSs such that a number of error-free dispersed storage error EDSs is equal to or greater than the second threshold number of error-free dispersed storage error EDSs.

19. The computing device of claim 10, wherein the processing module, when operable within the computing device based on the operational instructions, is further configured to:
rebuild a number of dispersed storage error EDSs such that a number of error-free dispersed storage error EDSs is equal to or greater than the first threshold number of error-free dispersed storage error EDSs, based on at least one of predetermined storage network system performance level, current storage network traffic load, and predetermined network traffic level.

20. A non-transitory computer readable storage device comprises:

a first memory section that stores operational instructions that, when executed by a computing device, causes the computing device to transmit a plurality of list slice requests to a plurality of storage units of a storage network storage pool, wherein each list slice request of the plurality of list slice requests is directed at a storage unit of the storage network storage pool associated with a first data segment of a set of data segments;

a second memory section that stores operational instructions that, when executed by the computing device, causes the computing device to:

receive one or more list slice response messages of a plurality of list slice response messages from the plurality of storage units of the storage network, wherein each list slice response message of the plurality of list slice response messages is associated with a list slice requests of the plurality of list slice requests;

determine whether a first threshold number of error-free encoded data slices (EDSs) associated with the first data segment has been stored in the plurality of storage units of the storage network;

in response to a determination that a first threshold number of error-free dispersed storage error EDSs has been stored in the plurality of storage units of the storage network, assign a first rebuilding priority to the first data segment;

in response to a determination that the first threshold number of error-free dispersed storage error EDSs has not been stored in the plurality of storage units of the storage network, determine whether a second threshold number of error-free dispersed storage error EDSs has been stored in the plurality of storage units of the storage network;

in response to a determination that the second threshold number of error-free dispersed storage error EDSs has been stored in the plurality of storage units of the storage network, assign a second rebuilding priority to the first data segment; and in response to a determination that a number of error-free dispersed storage error EDSs is between the first threshold number of error-free dispersed storage error EDSs and the second threshold number of error-free dispersed storage error EDSs, issue a decode threshold number of read slice requests to storage units known to store available error-free EDSs; and rebuild one or more dispersed storage error EDSs associated with the first data segment that are not error-free.

* * * * *